(12) United States Patent
Nakamura et al.

(10) Patent No.: US 9,091,418 B2
(45) Date of Patent: Jul. 28, 2015

(54) DISPLAY DEVICE AND TELEVISION RECEIVER

(75) Inventors: Shinichi Nakamura, Osaka (JP); Yohichi Ueno, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/124,205

(22) PCT Filed: Apr. 2, 2012

(86) PCT No.: PCT/JP2012/058802
§ 371 (c)(1),
(2), (4) Date: Dec. 5, 2013

(87) PCT Pub. No.: WO2012/169266
PCT Pub. Date: Dec. 13, 2012

(65) Prior Publication Data
US 2014/0125877 A1    May 8, 2014

(30) Foreign Application Priority Data

Jun. 7, 2011 (JP) .................................. 2011-127541
Dec. 22, 2011 (JP) .................................. 2011-282135
Mar. 28, 2012 (JP) .................................. 2012-074735

(51) Int. Cl.
*F21V 15/06* (2006.01)
*H04N 5/64* (2006.01)
(Continued)

(52) U.S. Cl.
CPC ................. *F21V 15/06* (2013.01); *F21V 29/15* (2015.01); *H04N 5/64* (2013.01); *H04N 5/655* (2013.01)

(58) Field of Classification Search
CPC ................. G02F 2001/13332; G02F 2201/36; G02F 2001/133628; G02F 1/133308
USPC .................................................. 348/836–843
See application file for complete search history.

(56) References Cited

U.S. PATENT DOCUMENTS 8,159,629 B2 * 4/2012 Yamashita et al. .............. 349/58
2002/0067591 A1 * 6/2002 Tajima .......................... 361/681
2005/0018416 A1 * 1/2005 Amaya .......................... 362/31

(Continued)

FOREIGN PATENT DOCUMENTS

JP    2000-321989 A    11/2000
JP    2001-75094 A     3/2001

(Continued)

OTHER PUBLICATIONS

International Search Report, issued in PCT/JP2012/058802, dated Jun. 12, 2012.

*Primary Examiner* — Mehrdad Dastouri
*Assistant Examiner* — Mohammed Rahaman
(74) *Attorney, Agent, or Firm* — Birch, Stewart, Kolasch & Birch, LLP

(57) ABSTRACT

The display device includes a display unit having a display surface on a front side thereof, a front cabinet enclosing a peripheral edge part of the display unit, and a back cabinet covering a back side of the display unit. In the display device, a light source is installed on an inner surface of the front cabinet facing an outer peripheral surface of the display unit, and the front cabinet and the back cabinet have grooves formed on the outer surfaces thereof. The front cabinet includes an elongated cavity formed in a front corner of the front cabinet. The cavity extends substantially parallel to an array direction of an LED.

23 Claims, 24 Drawing Sheets

(51) Int. Cl.
   *H04N 5/655*   (2006.01)
   *F21V 29/15*   (2015.01)

(56) References Cited

U.S. PATENT DOCUMENTS

| | | |
|---|---|---|
| 2005/0117283 A1* | 6/2005 | Lee et al. ............... 361/681 |
| 2006/0070280 A1 | 4/2006 | Yamamura et al. |
| 2008/0122993 A1* | 5/2008 | Nakamichi et al. .......... 348/789 |
| 2008/0297695 A1* | 12/2008 | Sekiguchi et al. ............. 349/65 |
| 2009/0015748 A1 | 1/2009 | Kujiraoka et al. |
| 2010/0027296 A1 | 2/2010 | Hamada |
| 2010/0066937 A1 | 3/2010 | Yamashita et al. |
| 2010/0171889 A1* | 7/2010 | Pantel et al. ............... 349/1 |
| 2010/0253874 A1* | 10/2010 | Ito et al. ............... 349/58 |
| 2011/0095970 A1 | 4/2011 | Yoo |
| 2011/0116016 A1 | 5/2011 | Mikubo et al. |
| 2011/0149200 A1 | 6/2011 | Joo |
| 2011/0176086 A1* | 7/2011 | Sekiguchi et al. ............. 349/62 |
| 2012/0106081 A1* | 5/2012 | Hubbard et al. ............. 361/696 |
| 2012/0106122 A1* | 5/2012 | Ryu et al. ............... 362/19 |
| 2012/0162567 A1 | 6/2012 | Shimomichi |

FOREIGN PATENT DOCUMENTS

| | | |
|---|---|---|
| JP | 2005-134591 A | 5/2005 |
| JP | 2005-345934 A | 12/2005 |
| JP | 2006-19574 A | 1/2006 |
| JP | 2006-58587 A | 3/2006 |
| JP | 2006-106272 A | 4/2006 |
| JP | 2006-330599 A | 12/2006 |
| JP | 2007-65267 A | 3/2007 |
| JP | 2008-136040 A | 6/2008 |
| JP | 2008-304630 A | 12/2008 |
| JP | 2008-311234 A | 12/2008 |
| JP | 2009-37212 A | 2/2009 |
| JP | 2009-134269 A | 6/2009 |
| JP | 2009-164455 A | 7/2009 |
| JP | 2009-210772 A | 9/2009 |
| JP | 2009-222991 A | 10/2009 |
| JP | 2010-72262 A | 4/2010 |
| JP | 2010-122429 A | 6/2010 |
| JP | 2011-96629 A | 5/2011 |
| JP | 2012-137672 A | 7/2012 |
| KR | 10-2009-0042452 A | 4/2009 |
| WO | 2008/090642 A1 | 7/2008 |
| WO | 2010/004810 A1 | 1/2010 |

\* cited by examiner

DISPLAY DEVICE AND TELEVISION RECEIVER

CROSS-REFERENCE TO RELATED APPLICATIONS

This application is the national phase under 35 U.S.C. §371 of PCT International Application No. PCT/JP2012/058802 which has International filing date of Apr. 2,2012 and designated the United States of America.

FIELD

The present invention relates to a display device and a television receiver such as a liquid crystal television, a plasma television or the like.

BACKGROUND AND SUMMARY

Display devices such as liquid crystal televisions, plasma televisions, or the like are being designed larger and larger, and heat generated from the inside of the display device is increasing. Therefore, a variety of heat release techniques for display devices are disclosed in the art (for example, see Japanese Patent Application Laid-open No. 2006-58587 and Japanese Patent Application Laid-open No. 2008-136040). Further, there is a need for the narrowing of a frame and the thinning in the display device.

However, as the size increase and the narrowing of a frame and the thinning of the display device are continuing, there is a concern that the temperature of the cabinet composing the display device also continues to rise high compared with a conventional display device. In such a case, it is becoming dangerous for a user to touch the cabinet when it has a high temperature.

In consideration of the above-mentioned circumstances related to a display device, it is an object of the present invention to provide a display device and a television receiver including a cabinet for which a user barely feels any heat even if he or she touches the cabinet.

A display device according to the present invention includes: a display unit having a display surface on its front side, a front cabinet enclosing a peripheral edge part of the display unit, and a back cabinet covering a back side of the display unit, wherein the front cabinet includes a cavity that prevents transference of heat.

In the display device according to the present invention, the front cabinet includes a cavity formed therein. The cavity is filled with air to have a function of preventing the transference of heat.

The display device according to the present invention is characterized in that: a light source is installed on an inner surface of the front cabinet facing an outer peripheral surface of the display unit, and the front cabinet or the back cabinet has a groove formed on an outer surface of the front cabinet or the back cabinet.

In the display device according to the present invention, a display unit, a front cabinet, and a back cabinet are included therein. The display unit has a display surface on the front side thereof. The front cabinet encloses a peripheral edge part of the display unit, and has a light source which generates heat and is installed on the inner surface facing the outer peripheral surface of the display unit. The back cabinet covers the back side of the display unit. In addition, the front cabinet or the back cabinet has a groove formed on an outer surface thereof.

A contact area between the outer surface of the cabinet and air is increased by the groove of the front cabinet or the back cabinet.

The display device according to the present invention is characterized in that: the front cabinet includes a front surface part enclosing a circumference of the display surface, and a peripheral surface part which is formed on a rear side of the front surface part along an outer peripheral edge of the front surface part to enclose the outer peripheral surface of the display unit; and the cavity is formed at a corner where the front surface part and the peripheral surface part join.

In the display device according to the present invention, the front cabinet includes a front surface part and a peripheral surface part. The front surface part covers a peripheral edge of the display surface positioned on the front side thereof. The peripheral surface part is formed on a rear side of the front surface part along an outer peripheral edge thereof to enclose the outer peripheral surface of the display unit. A cavity is formed in a corner where the front surface part and the peripheral surface part join.

The display device according to the present invention is characterized in that: a portion where the cavity is formed in the front cabinet protrudes further than other portions.

In the display device according to the present invention, since the periphery of the cavity protrudes outward, the surface area of the periphery of the cavity increases compared with the case of not protruding, and therefore the radiation efficiency improves. In addition, as the surface area increases, heat is dispersed and the surface temperature is lowered.

The display device according to the present invention is characterized in that: the front cabinet includes a communication hole which is formed in the cavity to communicate with the outside.

In the display device according to the present invention, air in the cavity flows through the communication hole communicating with the outside, and thereby the cooling efficiency is improved.

The display device according to the present invention is characterized in that: a plurality of communication holes are formed in the front cabinet.

In the display device according to the present invention, the front cabinet includes a plurality of holes formed therein, and thereby one hole functions as an air inlet hole and the other hole functions as an air outlet hole. Therefore, ventilation within the cavity is carried out smoothly so as to achieve fast cooling.

The display device according to the present invention is characterized in that: the front cabinet includes a front surface part covering a peripheral edge of the display surface, a peripheral surface part which is formed on a rear side of the front surface part along an outer peripheral edge of the front surface part to enclose the outer peripheral surface of the display unit; the cavity is formed in the corner where the front surface part and the peripheral surface part join; the front cabinet has a groove formed on an outer surface of the front cabinet including the corner; a plurality of light sources are installed on the inner surface of the front cabinet facing the outer peripheral surface of the display unit to be arrayed in a direction substantially orthogonal to the normal line of the outer peripheral surface of the display unit and the normal line of the display surface; and the groove is formed substantially parallel to the array direction of the light source.

In the display device according to the present invention, a plurality of light sources are installed on the inner surface of the front cabinet facing the outer peripheral surface of the display unit. The plurality of light sources are installed to be arrayed in the direction orthogonal to the normal line of the outer peripheral surface of the display unit and the normal line of the display surface of the display unit. The direction in which the groove formed on the outer surface of the front cabinet or the back cabinet extends is substantially parallel to the array direction of the light source.

The display device according to the present invention is characterized in that: the light source is a light emitting diode which is mounted on a substrate made of aluminum, and the substrate is installed in the front cabinet.

In the display device according to the present invention, the substrate on which the light emitting diode of the light source is mounted is made of aluminum, so that the heat conduction to the front cabinet is facilitated. Further, when the front cabinet is made of aluminum, the heat expansion rates of the substrate and the front cabinet become equal, so that the occurrence of distortion due to a bimetal effect is prevented.

The display device according to the present invention is characterized in that: the front cabinet has a groove formed on the outer surface of the front cabinet including the corner, and a depth of the groove on the outer surface of the corner is deeper than the depth of grooves formed on the other portion of the front cabinet.

In the display device according to the present invention, the front cabinet has a groove formed on the outer surface thereof including a front corner. A depth of the groove formed on the outer surface of the corner where the front surface part and the peripheral surface part join is deeper than the depth of grooves formed on the other portion of the front cabinet.

The display device according to the present invention is characterized in that: a cross-sectional shape, width, or depth of the groove is substantially constant in the array direction of the light source.

In the display device according to the present invention, the cross-sectional shape, width or depth of the groove may be constant in the array direction of the light source.

The display device according to the present invention is characterized in that: the cavity is penetrated substantially parallel to the array direction of the light source.

In the display device according to the present invention, the cavity is penetrated and the extending direction of the cavity is substantially parallel to the array direction of the light source.

The display device according to the present invention is characterized in that: the front cabinet is formed by extrusion molding.

In the display device according to the present invention, the front cabinet may be formed by extrusion molding.

The display device according to the present invention is characterized in that: the front cabinet is made of metal.

In the display device according to the present invention, the front cabinet is made of metal, so that it is possible to achieve efficient heat transmission.

The display device according to the present invention is characterized in that: the front cabinet is made of aluminum.

In the display device according to the present invention, as the front cabinet is made of aluminum, the weight reduction of the display device is facilitated and efficient heat release is achieved.

The display device according to the present invention includes a light guide plate which is disposed on the rear side of the display unit to emit an incident light toward the display unit, and is characterized in that: the display unit and the light guide plate are held in the front and back between the front cabinet and the back cabinet.

In the display device according to the present invention, since the display panel and the light guide plate are held in the front and back by the front cabinet and the back cabinet without a support member between the display panel and light guide plate, the dimension between the light guide plate and the display panel is shortened, so that the thinning of the device can be achieved. In addition, since the number of members for heat release is reduced, the weight reduction of the display device can be achieved.

The display device according to the present invention is characterized in that: the front cabinet protrudes rearward, and the light guide plate includes a pressing part configured to press the light guide plate to the rear side.

In the display device according to the present invention, the light guide plate is pressed by the pressing part from the front side, and thereby the holding force for the light guide plate is improved.

The display device according to the present invention is characterized in that: the back cabinet is made of aluminum.

In the display device according to the present invention, as the back cabinet is made of aluminum, the weight reduction of the display device is facilitated and efficient heat release is achieved.

The display device according to the present invention includes a cover which covers at least a part of the front cabinet.

In the display device according to the present invention, a user's hand is prevented, by the cover, from directly touching the front cabinet so as to improve safety.

The display device according to the present invention is characterized in that: the front cabinet is formed by jointing a plurality of rod-shaped members, and the cover covers a joint part between the rod-shaped members.

In the display device according to the present invention, the joint parts of the rod-shaped members are covered with a cover so as to prevent light leakage.

The display device according to the present invention is characterized in that: the light source is installed on the inner surface of the front cabinet facing the outer peripheral surface of the display unit, and the cover covers a portion corresponding to the inner surface on which the light source is installed, in an outer surface of the front cabinet.

In the display device according to the present invention, on the outer surface of the front cabinet, the portion corresponding to the inner surface of the front cabinet in which the light source is installed is covered by the cover so as to cover a place where the temperature is the highest due to the heat conducted from the light source.

The display device according to the present invention is characterized in that: a through hole is formed in a portion of the cover which covers the outer surface of the front cabinet.

In the display device according to the present invention, by forming a through hole in the cover, the high temperature portion is covered to improve safety, and the heat conducted to the front cabinet is reliably released.

The display device according to the present invention is characterized in that: the cover has a non-covering part.

In the display device according to the present invention, the cover is provided with a non-covering portion (for example, a notch or hole), so that when the non-covering portion is positioned on the outer surface located on the opposite side of the inner surface of the front cabinet in which the light source is installed, the radiation efficiency is improved. In addition, when the non-covering portion is positioned on the outer surface of the portion where the light source is not installed in the front cabinet, the portion where the light source is installed is covered and the portion where the light source is not installed is exposed, so that heat is released from the exposed portion.

A television receiver according to the present invention includes: the display device according to the above; and a receiving unit which receives television broadcasts, wherein the display device is configured to display an image of the television broadcasts received by the receiving unit.

In the television receiver according to the present invention, the television receiver includes the display device described above, and a receiving unit which receives television broadcasts. The display device is configured to display an image related to the television broadcasts received by the receiving unit.

According to the present invention, the user barely feels any heat even if he or she touches the cabinet of the display device and the television receiver.

DETAILED DESCRIPTION OF NON-LIMITING EXAMPLE EMBODIMENTS

Hereinafter, a display device according to one embodiment of the present invention will be described in detail with reference to the accompanying drawings illustrating the embodiments thereof. The display device according to the present embodiment includes, for example, a television receiver such as a liquid crystal television, a plasma television, a cellular phone capable of receiving one-segment broadcasting or the like. Further, the display device according to the present embodiment includes a liquid crystal display of a personal computer, an automatic teller machine (ATM), a ticket vending machine, or the like, an organic electro luminescence (EL) display, a surface-conduction electron-emitter display (SED) or the like. Further, the display device according to the present embodiment includes a display of a smart phone, a tablet terminal or the like. Hereinafter, as an example of the display device, the television receiver will be described with illustration.

Meanwhile, the present invention is not intended to be limited to the following embodiments.

Embodiment 1

Figure 1:
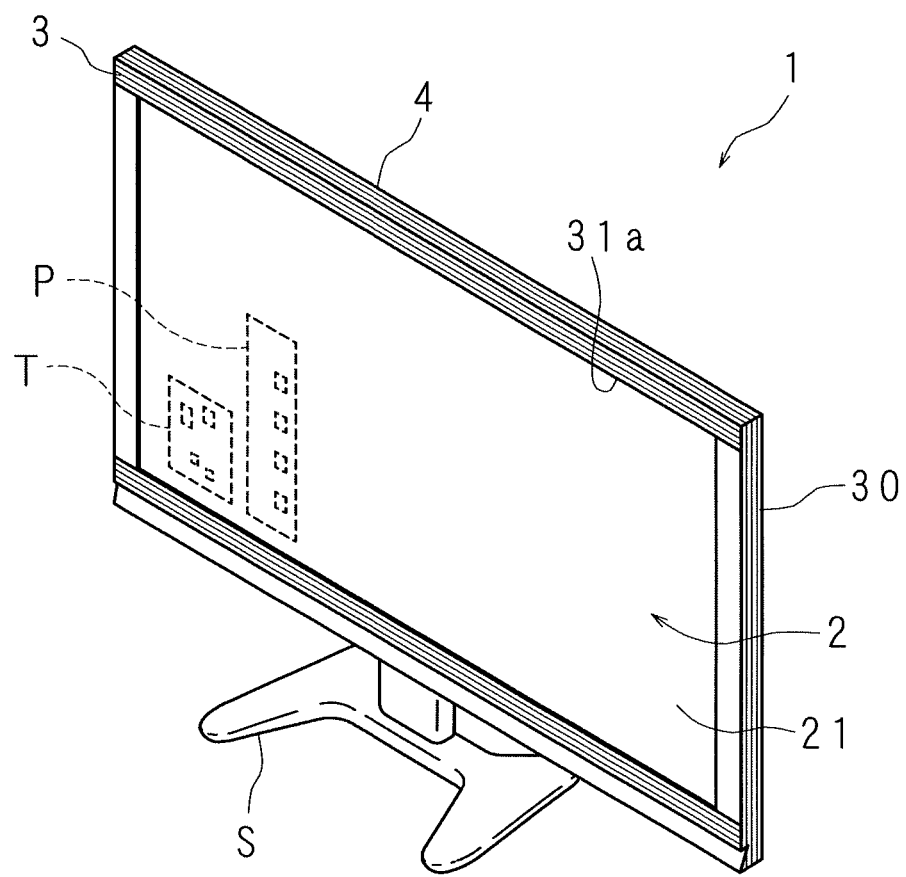
FIG. 1 is a schematic perspective view of a television receiver.

FIG. 1 is a schematic perspective view of a television receiver. Herein, when a viewer faces a display surface 21 of the television receiver 1 that displays an image, the viewer side of the display surface 21 will be referred to as a front side and the inward side of the display surface 21, which is the opposite side of the front side, will be referred to as a back or rear side. The display surface 21 has a laterally long and substantially rectangular shape, and from a viewer's position of facing the display surface 21, the right side of the display surface 21 in a longitudinal direction thereof will be referred to as right and the left side thereof in the longitudinal direction will be referred to as left. Further, from a viewer's position of facing the display surface 21, the upper side of the display surface in a lateral direction thereof will be referred to as top and the lower side thereof in the lateral direction will be referred to as bottom. FIG. 1 shows the television receiver 1 as seen obliquely from the front upper right.

The television receiver 1 includes a display unit 2, a front cabinet 3, a back cabinet 4, a receiving unit T, a power source P, and a stand S. The display unit 2 includes a front peripheral edge part enclosed by the front cabinet 3 of the front side. The front cabinet 3 has a rectangular frame shape as seen from the front. The front cabinet 3 has a plurality of grooves 30 which are formed on a front upper portion, a front lower portion, and a peripheral surface part substantially parallel with an outer periphery of the display surface 21. The back cabinet 4 of the rear side has a substantially flat plate shape and covers the display unit 2 and a part of the front cabinet 3 from the rear side.

The front cabinet 3 may be made of an extrusion molded aluminum member. The back cabinet 4 having a rectangular tray shape of which the front side is open may be made of a pressed aluminum member. When the front cabinet 3 and the back cabinet 4 are made of aluminum, it is possible to achieve efficient heat dissipation and prevent the occurrence of distortion by reducing a difference in thermal expansion coefficient of these cabinets. Further, the front cabinet 3 and the back cabinet 4 may be made of another metallic member such as an electrogalvanized steel sheet, a copper member or the like. In this case, electrogalvanizing may be conducted in view of corrosion resistance, aesthetics or the like. In addition, the front cabinet 3 and the back cabinet 4 may be made of resin by extrusion molding.

The receiving unit T and the power source P are mounted between the display unit 2 and the back cabinet 4. The receiving unit T receives television broadcasts. The power source P supplies power to the television receiver 1. The television receiver 1 displays an image related to the television broadcasts received by the receiving unit T on the display surface 21 of the display unit 2. The stand S supports the display unit 2, the front cabinet 3, and the back cabinet 4 in an upright state.

Figure 2:
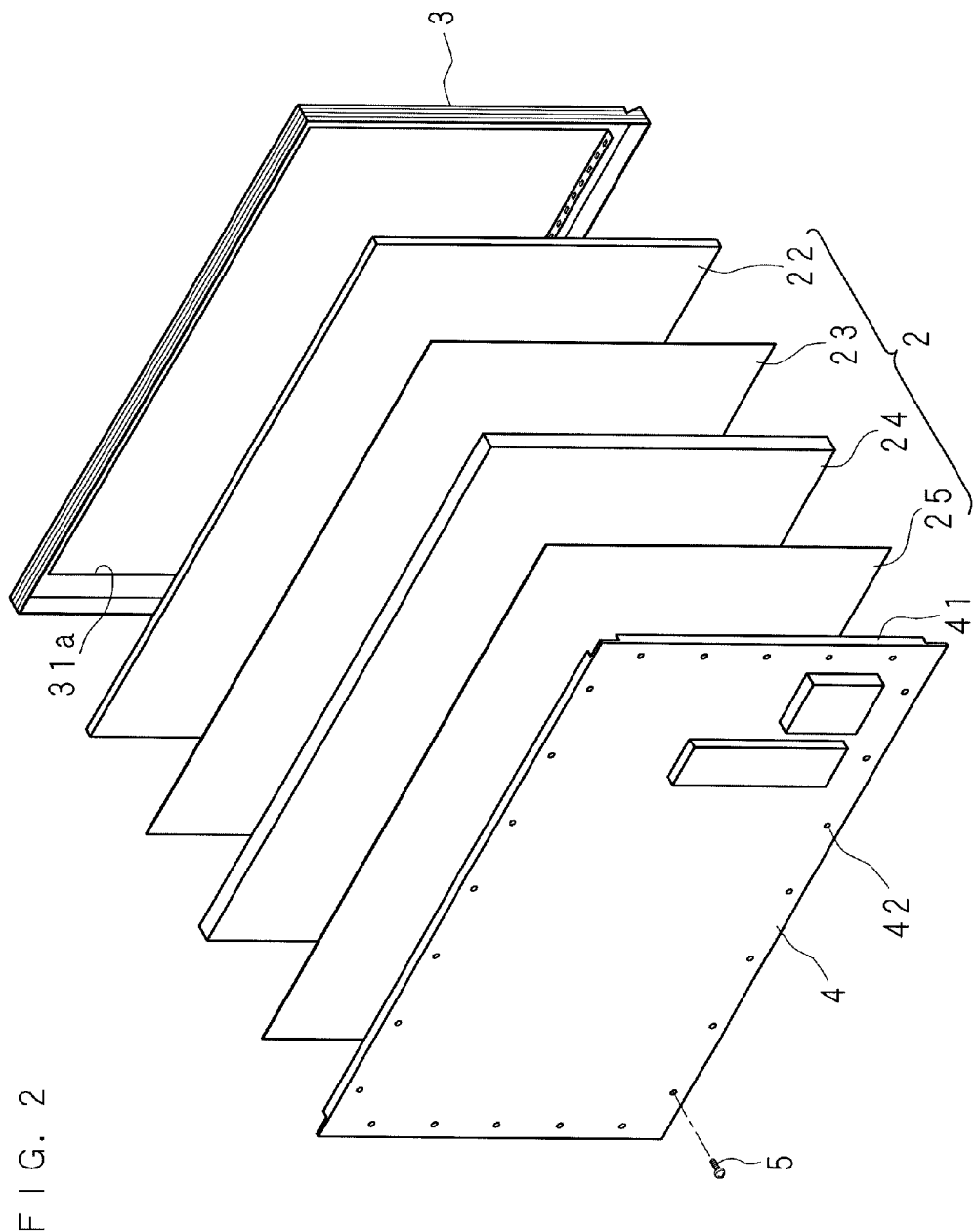
FIG. 2 is a schematic exploded perspective view of a display unit, a front cabinet, and a back cabinet.

FIG. 2 is a schematic exploded perspective view of the display unit 2, the front cabinet 3, and the back cabinet 4. FIG. 2 shows the display unit 2, the front cabinet 3, and the back cabinet 4 as seen obliquely from the upper rear side.

The display unit 2 has the display surface 21 formed on the front thereof to display the image and is formed in a laterally long rectangular parallelepiped shape taken as a whole. The display unit 2 includes a liquid crystal panel 22, a diffusion sheet 23, a light guide plate 24, and a reflection sheet 25. These members are laminated in the order of the liquid crystal panel 22, the diffusion sheet 23, the light guide plate 24, and the reflection sheet 25 from the front side to the rear side thereof. Each of the liquid crystal panel 22, the diffusion sheet 23, the light guide plate 24, and the reflection sheet 25 has a substantially rectangular shape in a plane view.

Figure 3:
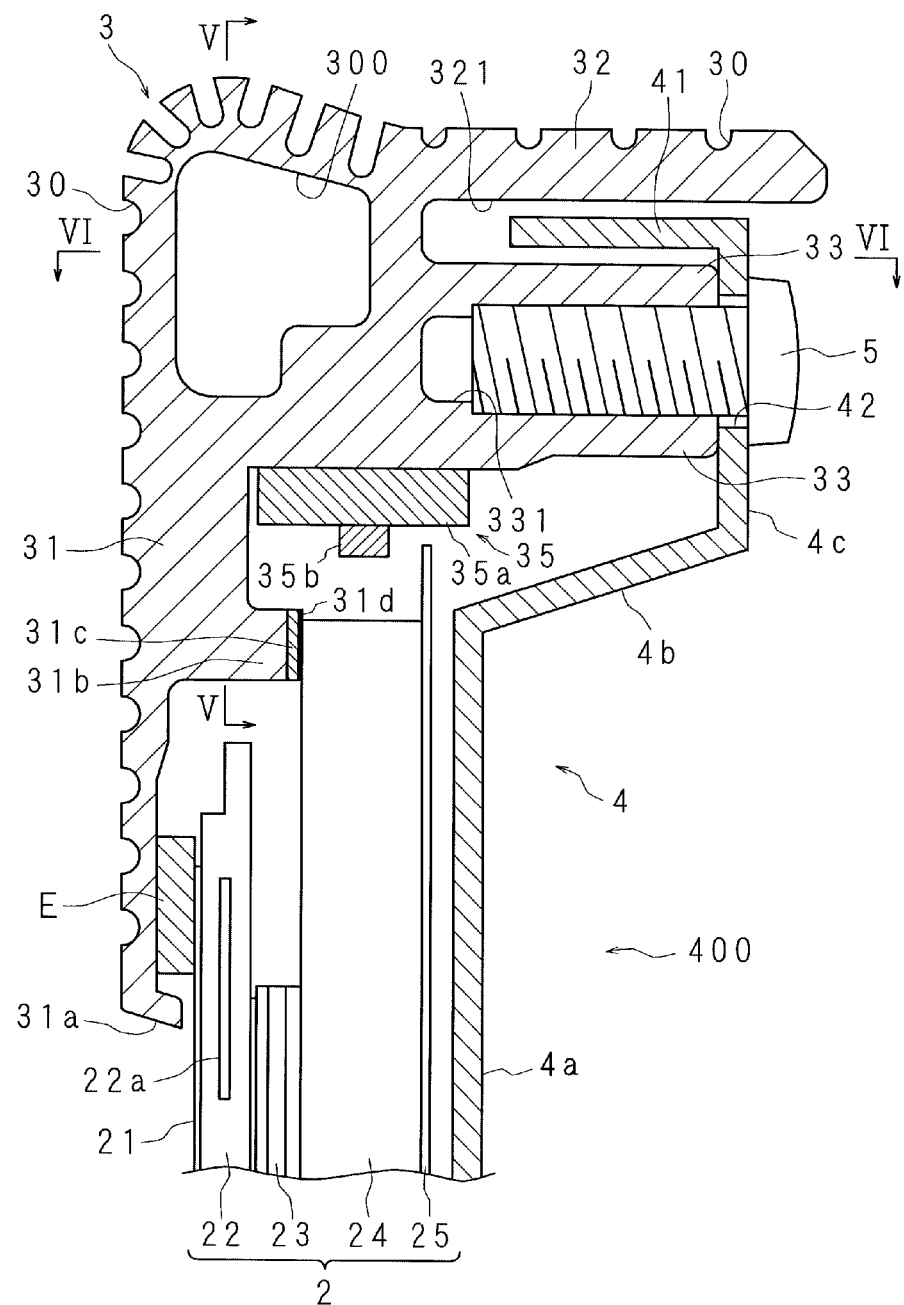
FIG. 3 is a cross-sectional view of the display unit, the front cabinet, and the back cabinet.
Figure 4:
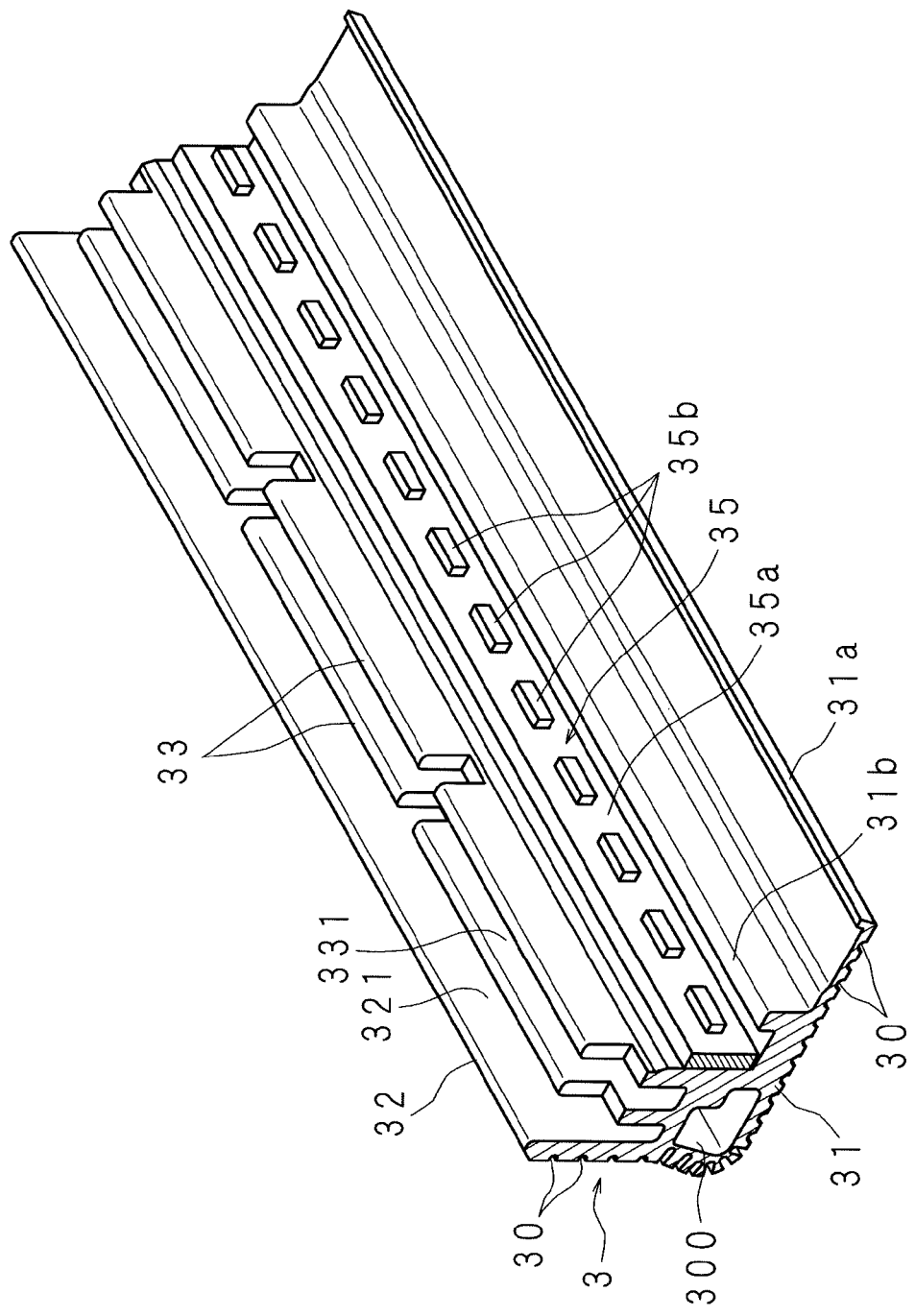
FIG. 4 is a perspective view schematically showing a part of the front cabinet.

FIG. 3 is a cross-sectional view of the display unit 2, the front cabinet 3 and the back cabinet 4, and FIG. 4 is a perspective view schematically showing a part of the front cabinet 3. FIG. 3 shows a part of the upper cross section of the display unit 2, the front cabinet 3, and the back cabinet 4 cut in a plane substantially parallel to the normal line and the vertical direction of the display surface 21.

As shown in FIGS. 3 and 4, the front surface part 31 of the front cabinet 3 is protruded backward between an opening 31a and a rib 33 to be described later, and includes a pressing part 31b formed so as to press the light guide plate 24. The pressing part 31b is disposed so as to face the edge part of the light guide plate 24. An elastic member 31c and a reflection sheet 31d (a reflection member) are attached on a protruding end portion of the pressing part 31b in this order. The protruding end portion of the pressing part 31b presses the light guide plate 24 from the front side to the rear side through the elastic member 31c and the reflection sheet 31d. The elastic member 31c may be made of a resin member (for example, a high-density micro-cell urethane foam, a rubber or an elastomer).

Since an edge part of the opening 31a presses the liquid crystal panel 22 and the light guide plate 24 from the front side to the rear side, and further the pressing part 31b presses the light guide plate 24 from the front side, the holding force for the light guide plate 24 is improved, and thereby the light guide plate 24 can be fixed stably at a predetermined position. Further, since the reflection sheet 31d is provided on the protruding end portion (the portion directly in contact with the light guide plate 24) of the pressing part 31b, light is reflected surely at the place pressed by the pressing part 31b, so that the luminance of the liquid crystal panel 22 can be improved. Further, since the pressing force toward the light guide plate 24 from the protruding end portion of the pressing part 31b is dispersed by the elastic member 31c, damage and distortion to the light guide plate 24 can be prevented. Further, when the elastic member 31c is formed of a member having translucency, the elastic member 31c and the reflection sheet 31d may be attached on the protruding end portion of the pressing part 31b in the order of the reflection sheet 31d and the elastic member 31c.

The liquid crystal panel 22 of the display unit 2 displays the image using light emitted from the rear side by a so-called edge light type backlight. Further, the liquid crystal panel 22 may use light emitted by a direct type backlight.

The light guide plate 24 is formed in a rectangular parallelepiped shape and is made of a transparent resin with excellent light transmittance such as acryl, polycarbonate or the like. The light guide plate 24 has a surface on which a rough coarse surface such as a dotted pattern or the surface of a pear skin, for example, is molded. The light guide plate 24 and a light emitting diode (LED) 35b to be described later are positioned so that light from the LED 35b enter the peripheral surface of the light guide plate 24.

A light shielding part 22a which blocks the passage of light is formed inside the peripheral edge portion of the liquid crystal panel 22. The light shielding part 22a has a portion positioned outside of the opening 31a, and this portion faces a portion of an elastic member E on the side of the opening 31a. A portion of the elastic member E on the opposite side of the opening 31a is positioned further outside from the light shielding part 22a.

The reflection sheet 25 is made of a white resin with good reflexibility, reflects the light incident on the light guide plate 24, and has a function of returning the reflected light to the light guide plate 24. Paint with good reflexibility may be applied to the surface of the reflection sheet 25. The light guide plate 24 and the reflection sheet 25 uniformize the incident light from the LED 35b and emit it to the diffusion sheet 23.

The diffusion sheet 23 is made into a plate-shaped member made of resin in which light scattering particles are dispersed and blended. The diffusion sheet 23 diffuses the light emitted to the front side from the light guide plate 24, and emits the light having a uniformized luminance distribution on the liquid crystal panel 22.

The liquid crystal panel 22 modulates the light emitted from the diffusion sheet 23, and displays an image on the display surface 21 of the front side. The liquid crystal panel 22 is pressed by the front cabinet 3 through an elastic member E. The elastic member E may be high-density microcell polyurethane foam, for example, and arranged on the circumference of the front surface of the liquid crystal panel 22.

Further, the liquid crystal panel 22 may have a configuration in which publicly known optical sheet materials such as a prism sheet, a polarized sheet, or the like are properly laminated as necessary.

The front cabinet 3 includes a front surface part 31, a peripheral surface part 32, and a rib 33.

The front surface part 31 is a rectangular frame shaped member covering the peripheral edge part of the display surface 21 of the display unit 2. As shown in FIG. 1 and FIG. 2, the front surface part 31 has a substantially rectangular opening 31a formed therein, and a user can see a image displayed on the display surface 21 of the display unit 2 through the opening 31a.

The peripheral surface part 32 is formed so as to protrude rearward from the outer peripheral edge of the front surface part 31. The peripheral surface part 32 is formed in a rectangular frame shape as seen from the rear side, and encloses and covers the peripheral surface of the display unit 2.

The rib 33 is formed between the peripheral surface part 32 and the display unit 2 to protrude rearward from the rear surface of the front surface part 31. The rear tip of the rib 33 is positioned on the front of the rear tip of the peripheral surface part 32. The rib 33 is formed in an elongated rectangular parallelepiped shape. A total of four ribs are formed so as to correspond to the top, bottom, left and right sides of the light guide plate 24. A rib groove 331 which extends parallel to the rib 33 in the longitudinal direction is formed in the rear surface of each rib 33.

In addition, a peripheral surface groove 321, which is a gap or a void, is formed between the rib 33 and the peripheral surface part 32.

The base of the ribs 33 facing respectively the upper surface part and the lower surface part of the light guide plate 24 is provided with a light source 35. The light source 35 includes one or a plurality of LED substrates 35a, and a plurality of LEDs 35b, 35b, . . . , and 35b which are mounted on the LED substrates 35a.

The LED substrate 35a may be made of aluminum and one by one screw-fixed to the rib. The LED substrate 35a is formed in an elongated rectangular shape substantially parallel to a longitudinal direction of the peripheral surface of the light guide plate 24. The longitudinal direction of the LED substrate 35a is also substantially the same as a direction orthogonal to the normal line of the peripheral surface of the light guide plate 24 and the normal line of the display surface 21.

The LED 35b is installed on the LED substrate 35a in parallel along the longitudinal direction of the LED substrate 35a. When the LED substrate 35a having the LED 35b mounted thereon is made of aluminum, the heat conduction to the front cabinet 3 is facilitated.

Further, the LED substrate 35a may be adhered to the base of the rib 33 by a double-sided tape with high thermal conductivity. In addition, the LED substrate 35a may be installed on the base of the rib 33 facing respectively the sides of the two left and right surfaces of the light guide plate 24, and may be installed on the base of the rib 33 facing respectively the peripheral surfaces of the four top, bottom, left and right surfaces of the light guide plate 24.

Further, the LED 35b is one example of a light source that may be used to emit light to the light guide plate 24, however, the light source may be, for example, an electric bulb, hot-cathode fluorescent lamp, electro luminescence (EL) lamp, or cold-cathode tube.

An outer surface of the front cabinet 3, that is, an outer surface of the front surface part 31 and the peripheral surface part 32 includes grooves 30 formed substantially parallel to an array direction of the LED 35b. In the cross section of FIG. 3, the LED 35b is positioned substantially at the center of the upper portion of the front cabinet 3, and the grooves 30 are formed across the entire outer surface of the front cabinet 3. The shape, width and depth of the grooves 30 are substantially constant in the array direction of the LED 35b. Therefore, when the front cabinet 3 is cut in a plane substantially perpendicular to the array direction of the LED 35b, the shape, depth, width, position, interval, or the like of the grooves 30 are substantially the same at any cut position. The width of the groove 30 is configured narrower than the size of a finger. Alternatively, the width of the groove 30 is of the size to the extent that a finger cannot touch the inner surface of the groove 30, when the finger touches the outer surface of the front cabinet 3. Therefore, when the finger touches the outer surface of the front cabinet 3, the finger touches only the flat portion between the grooves 30.

As shown in FIG. 1, when the whole of the front cabinet 3 is seen downward from the above front, the groove 30 is formed in a rectangle along the outer periphery of the front cabinet 3 or the opening 31a.

In FIGS. 1, 2 and 3, a plurality of grooves 30 are illustrated, but the number of the grooves 30 is not limited to a specific number. The cross-sectional shape of the grooves 30 in FIG. 3 is semicircular, for example, but it is not limited thereto. The cross-sectional shape of the grooves 30 may be rectangular, trapezoid, semi-elliptic or the like.

Alternatively, the cross-sectional shape of the grooves 30 may be triangular. In this regard, by removing an interval between the grooves 30, the outer surface of the front cabinet 3 may be molded so as to have a notch-cutting shape.

As shown in FIG. 3, the depth of the groove 30 formed in the front corner where the front surface part 31 and the peripheral surface part 32 join is deeper than the depth of the grooves 30 formed on the other outer surface of the front cabinet 3 excluding the front corner. The front corner, especially the upper front corner, is a portion of the front cabinet 3 where the user frequently touches.

The back cabinet 4 is installed on the rear side of the light guide plate 24. The back cabinet 4 is formed in a rectangular tray shape with the front side open and disposed vertically. A concave part 400 protruding forwardly is formed in the central portion of the back cabinet 4. The bottom portion 4a of the concave part 400 has a plate shape substantially parallel with the light guide plate 24 and is formed to be facing and close to the reflection sheet 25. The peripheral edge portion of the bottom portion 4a faces the pressing part 31b. The lateral portion 4b of the concave part 400 continues to the bottom portion 4a and is inclined so as to expand backward from the bottom portion 4a. The peripheral edge portion of the bottom portion 4a and the pressing part 31b are at the same position in a direction orthogonal to the front-back direction.

A rear end of the lateral portion 4b is positioned further rearward from the rib 33 and the peripheral surface groove 321. The rear end of the lateral portion 4b continues to a peripheral edge portion 4c of a plate shape substantially parallel to the bottom portion 4a, and the peripheral edge portion 4c extends into the peripheral surface groove 321.

An extension end portion of the peripheral edge portion 4c continues to a plate-shaped extension part 41 extending forward. The extension part 41 protrudes forward so as to rim the outer peripheral end of the back cabinet 4 facing the peripheral surface groove 321 of the front cabinet 3 along the peripheral surface groove 321. The extension part 41 is formed substantially parallel to the longitudinal direction of the peripheral surface groove 321 in a plate shape. The thickness of the extension part 41 is equal to the width of the peripheral surface groove 321 or greater than the width of the peripheral surface groove 321, and the extension part 41 is formed fittably in the peripheral surface groove 321. In FIG. 3, the thickness of the extension part 41 is drawn thin in order to make it easy to see.

In addition, the extension part 41 may be a wedge shape whose thickness becomes thinner toward the front tip, or may be a shape in which the thickness of the front tip is thicker than the thickness of the other portions. The circumferential length of the extension part 41 may be equal to the length of the peripheral surface groove 321 or may be different from the length of the peripheral surface groove 321.

The back cabinet 4 includes a circular screw insert hole 42 formed at a position facing the rib groove 331 of the front cabinet 3. The number of screw insert holes 42 corresponding to one rib groove 331 is seven or five in the example of FIG. 2. However, the number of screw insert holes 42 corresponding to one rib groove 331 is not limited thereto, but may be other than seven or five. When the corresponding rib groove 331 is different, the number of the screw insert holes 42 corresponding to one rib groove 331 may be different.

By screwing a tapping screw 5 into the rib groove 331 from the rear side of the screw insert hole 42, the back cabinet 4 is coupled to the front cabinet 3. Therefore, the size of the inner diameter of the screw insert hole 42 is a size suitable for the shank of the tapping screw 5 to be inserted therein. The tapping screw 5 is made of a material such as iron, aluminum, stainless steel or the like. The head portion of the tapping screw 5 may be any one of a pan head, flat head, truss head, or the like, and is not limited to a specific shape.

Further, the size of the outer diameter of the shank of the tapping screw 5 is set to a size slightly greater than the width of the rib groove 331. Alternatively, the width of the rib groove 331 is set to a width slightly narrower than the outer diameter of the tapping screw 5.

Figure 5:
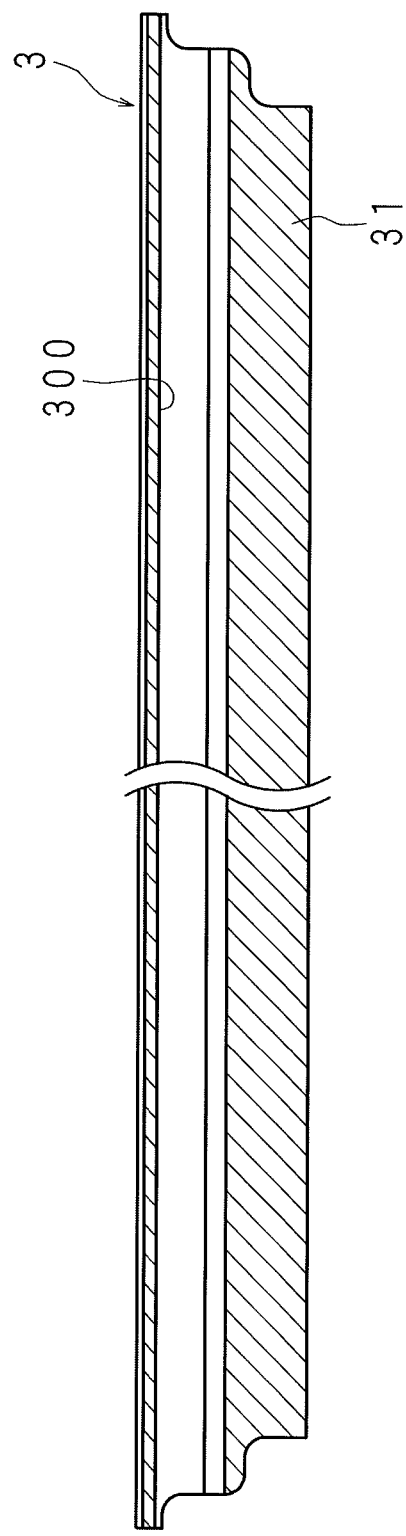
FIG. 5 is a cross-sectional view of the front cabinet taken on a cutting line V-V of FIG. 3.

FIG. 5 is a cross-sectional view of the front cabinet 3 taken on a cutting line V-V of FIG. 3. FIG. 5 shows a substantially vertical cross section of the front cabinet 3 as seen from the front side. The upper portion of FIG. 5 is top and the lower portion of FIG. 5 is bottom.

Figure 6:
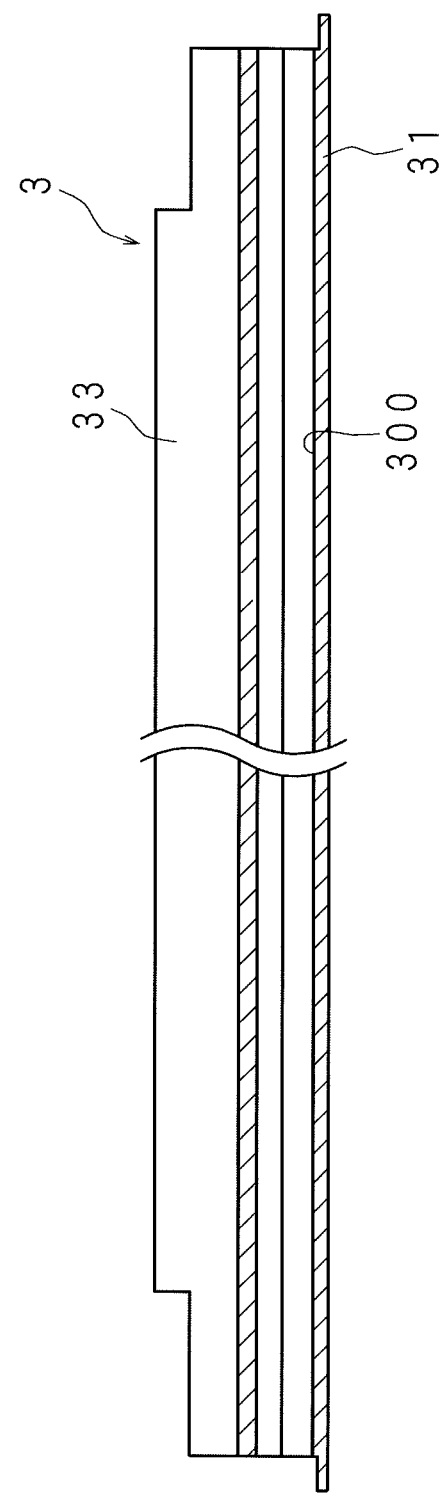
FIG. 6 is a cross-sectional view of the front cabinet taken on a cutting line VI-VI of FIG. 3.

FIG. 6 is a cross-sectional view of the front cabinet 3 taken on a cutting line VI-VI of FIG. 3. FIG. 6 schematically shows a vertical cross section of the front cabinet 3 as seen from above. The upper portion of FIG. 6 is the rear side of the television receiver 1, and the lower portion of FIG. 6 is the front side of the television receiver 1.

An elongated hollow cavity 300 substantially parallel to the array direction of the LED 35b is formed in each of the upper and lower front corners of the front cabinet 3 where the front surface part 31 and the peripheral surface part 32 join. The direction in which the cavity 300 extends is substantially the same as the direction in which the grooves 30 extend.

When the front cabinet 3 is cut in a plane substantially perpendicular to the longitudinal direction of the cavity 300, the shape of the cavity 300 is substantially a polygon having a surface substantially parallel with the outer surface of the front cabinet 3. For instance, in the example of FIG. 3, the outer surface of the peripheral surface part 32 protrudes upward from the rear side to the front side, and the inner surface upward of the cavity 300 is inclined upward from the rear side to the front side. In the example of FIG. 3, the corner surface of the cavity 300 of the rear and lower side near to the LED substrate 35a protrudes inward of the cavity 300. Therefore, in the example of FIG. 3, the cross section shape of the cavity 300 is substantially a hexagon with a substantially rectangular corner protruding inward. The volume of the cavity 300 part of the rear and lower side near the LED substrate 35a is smaller than that of the other portions of the cavity 300.

Further, the shape of the cavity 300 as cut in a plane substantially perpendicular to the longitudinal direction may be any one of a polygon, circle, ellipse, irregular shape or the like. Further, the number of cavities 300 is not limited to one, but a plurality of cavities 300 may be formed in the same direction.

According to the television receiver 1, the cavity 300 is formed at the front corner of the front cabinet 3 in which there are many opportunities for the user to touch. When the front cabinet 3 is made of metal, for example, the cavity 300 is occupied by air whose thermal conductivity is less than that of the metal. Therefore, the cavity 300 can reduce the flow rate of the heat which is transferred from the LED 35b to the front corner of the front cabinet 3. Therefore, the cavity 300 has an effect wherein the user barely feels any heat when he or she touches the front corner of the front cabinet 3.

In addition, when the cavity 300 is formed in the front cabinet 3, it is possible to reduce raw materials by as much as that of the volume of the cavity 300.

Further, a heat insulating material with low thermal conductivity may be filled in the cavity 300. Heat insulating materials with low thermal conductivity such as glass wool, rock wool, urethane foam, phenol foam, cellulose fiber, sheep wool or the like, may be used.

The above-described grooves 30 of the front cabinet 3 or the back cabinet 4 are consecutively formed substantially parallel with the array direction of the LED 35b. However, the grooves 30 may be formed discontinuously. In addition, the direction of the grooves 30 is not limited to the direction substantially parallel with the array direction of the LED 35b. For example, the direction of the grooves 30 may be the direction substantially orthogonal to the array direction of the LED 35b.

Figure 7:
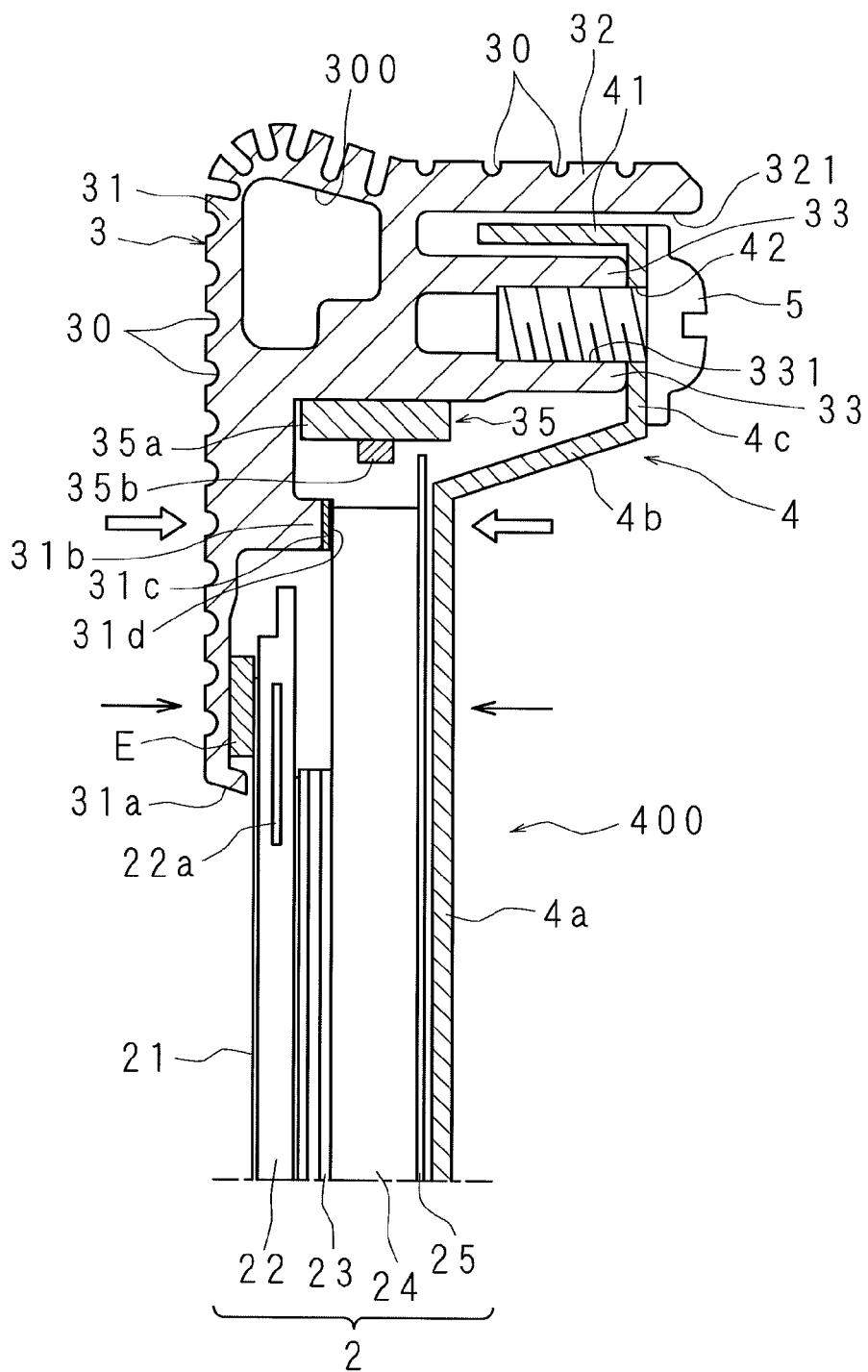
FIG. 7 is a cross-sectional view for illustrating the holding by the front cabinet and the back cabinet.

FIG. 7 is a cross-sectional view for illustrating the holding by the front cabinet 3 and the back cabinet 4. As shown in FIG. 7, in the back cabinet 4, the peripheral edge portion of the bottom portion 4a of the concave part 400 faces the pressing part 31b. The peripheral edge portion of the bottom portion 4a and the pressing part 31b exist at the same position in the direction orthogonal to the front-back direction. Therefore, when the tapping screw 5 is screwed in the rib 33, forces opposite to the light guide plate 24 act forward and backward between the peripheral edge portion of the bottom portion 4a and the pressing part 31b (see white arrows shown in FIG. 7). The light guide plate 24 is held by strong forces in the front and back to be supported stably. Further, between the bottom portion 4a and the edge part of the opening 31a, opposite forces act forward and backward respectively to the liquid crystal panel 22 and the light guide plate 24 (see arrows shown in FIG. 7), and together with the forces shown in white arrows, it is possible to fix the liquid crystal panel 22 and the light guide plate 24 firmly.

Since the back cabinet 4 is provided with the concave part 400, the back cabinet 4 is protruded forward to the place facing the pressing part 31b from the central portion thereof. Therefore, at least from the edge part of the opening 31a to the pressing part 31b, the front-back width of the front cabinet 3 and the back cabinet 4 is narrow. Since it is possible to hold the light guide plate 24 and the liquid crystal panel 22 in this narrowed portion, the light guide plate 24 and the liquid crystal panel 22 are strongly held at two places in the front and back as described above, whereby it is possible to reliably fix the light guide plate 24 and the liquid crystal panel 22 at a predetermined position.

Next, an outline of the assembling method of the television receiver 1 will be described.

The front cabinet 3 is put on a horizontal surface with the front side of the front cabinet 3 facing down. The liquid crystal panel 22, the diffusion sheet 23, the light guide plate 24, and the reflection sheet 25 are laminated in this order on the front cabinet 3.

The back cabinet 4 is positioned with respect to the front cabinet 3 so that the extension part 41 of the back cabinet 4 faces the peripheral surface groove 321 of the front cabinet 3. The extension part 41 is fitted in the peripheral surface groove 321, and the front cabinet 3 and the back cabinet 4 are coupled. The tapping screw 5 is inserted into the screw insert hole 42 of the back cabinet 4, and the shank of the tapping screw 5 is screwed to the rib groove 331.

According to television receiver 1, it is possible to increase the surface area where the front cabinet 3 comes into contact with outside air by forming the grooves 30 on the outer surface of the front cabinet 3. Thereby, the radiation effect of the television receiver 1 is raised, so that it is possible to suppress a rise in temperature of the front cabinet 3 and the back cabinet 4.

When a temperature of the cabinet of electric equipment rises above a predetermined temperature, it may be hard for a user to touch the cabinet. However, if the front cabinet 3 is provided with a groove 30 formed on the outer surface thereof with a width smaller than the size of a finger, the contact area on which the user comes into contact with the front cabinet 3 becomes smaller. Therefore, the television receiver 1 can lower the temperature a user will experience as compared with the case that the groove 30 is not provided.

Further, the groove 30 may be formed on the back cabinet 4. The direction of the groove 30 of the back cabinet 4 is substantially the same as the array direction of the LED 35*b*. In addition, the width of the groove 30 of the back cabinet 4 is narrower than the size of a finger as with the groove 30 of the front cabinet 3.

The groove 30 may be formed on the inner surface of the front cabinet 3 or the back cabinet 4. In addition, together with the groove 30, embossing having a small protrusion may be processed on the outer or inner surface of the front cabinet 3 and the back cabinet 4.

LED 35*b* will have its luminance decreased as temperature increases because the package, fluorescent body, etc. are degraded. In addition, as the temperature of the LED 35*b* becomes higher, chromaticity also changes. Therefore, if there is unevenness in the temperature distribution inside the front cabinet 3, deviation occurs in the luminance, color and life of the LED 35*b*.

However, according to the television receiver 1, the groove 30 is formed substantially parallel to the array direction of the LED 35*b*. Further, the shape, width and depth of the groove 30 are substantially constant in the array direction of the LED 35*b*. Therefore, when the front cabinet 3 is cut by the plane substantially perpendicular to the array direction of the LED 35*b*, the shape and area of the cross section of the front cabinet 3 are substantially constant regardless of the difference of the cutting position.

The heat generated from the LED 35*b* is transmitted to the front cabinet 3 through the LED substrate 35*a*, and is discharged into air from the outer surface of the front cabinet 3. Because the heating values of respective LEDs 35*b* are the same and the shape and area of the cross section of the front cabinet 3 in the array direction of the LED 35*b* are the same, the temperature distribution inside the front cabinet 3 which is a passage of a heat generated from the LED 35*b* is the same regardless of the difference of the cutting position. Therefore, no unevenness in temperature occurs between the respective LEDs 35*b* arrayed on the LED substrate 35*a*. Therefore, the structure of the groove 30 substantially parallel with the array direction of the LED 35*b* can reduce the differences of the luminance, color and life between the LEDs 35*b*.

According to the television receiver 1, the depth of the groove 30 on the outer surface of the front corner of the front cabinet 3 is deeper than the depth of grooves 30 formed on the other portion of the front cabinet 3. Accordingly, in the front corner of the front cabinet 3, the area of contact with air per unit area of a peak contact face of the front cabinet 3 becomes greater than that of the other portions. Here, the peak contact face is a plane made by connecting the protruded flat portions excluding the grooves 30 on the outer surface of the front cabinet 3. The front corner of the front cabinet 3 where the surface area in contact with air is large has increased radiation efficiencies, so that temperature decreases efficiently. Therefore, even if a user touches the front corner of the front cabinet 3, the user barely feels any heat.

Further, the outer surface of the front corner of the front cabinet 3 may be formed in a fin shape by narrowing the intervals and widening the widths of the grooves 30 compared to those on the outer surface shown in FIG. 3. Alternatively, the density of the number of the grooves on the outer surface of the front corner of the front cabinet 3 may be made higher than the density of the number of the grooves of the other portions. Thereby, the area of contact with the front cabinet 3 when the user comes into contact with the front corner becomes smaller than the area of contact in the other portions of the front cabinet 3, and thus the user even more barely feels any heat.

For instance, the front cabinet 3 is manufactured as follows.

Figure 8A:
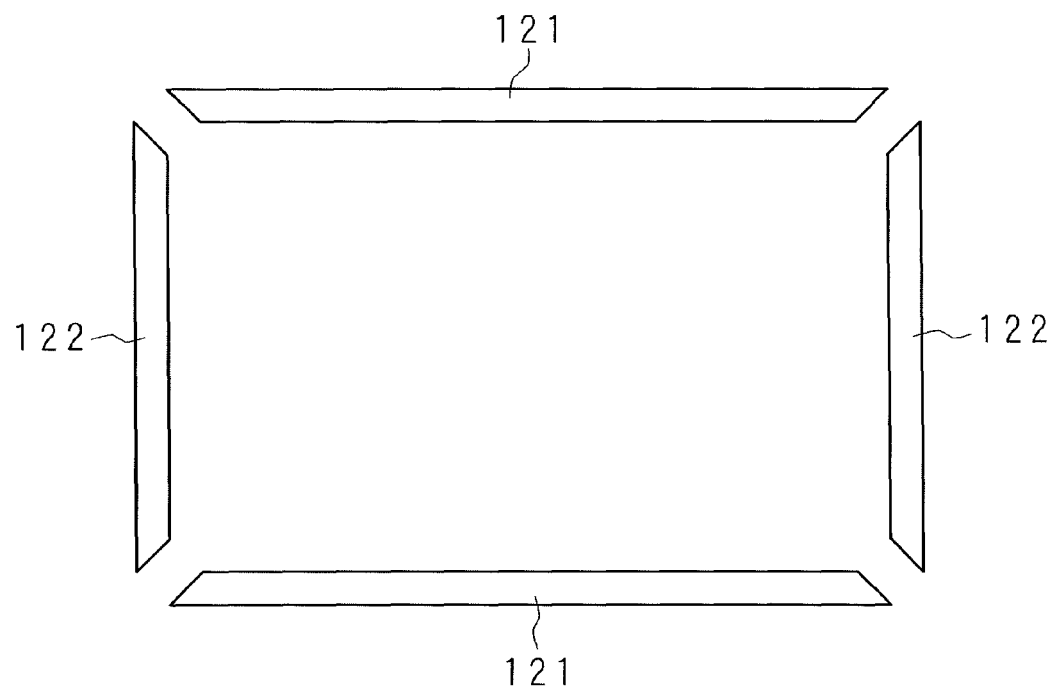
FIG. 8A is a view for illustrating a manufacturing process of the front cabinet.

FIG. 8 is views for illustrating the manufacturing process of the front cabinet 3. As shown in FIG. 8A, two elongated long rod 121 and 121 and two short rod 122 and 122 that are shorter than the long rod 121 are prepared. The long rod 121 and the short rod 122 are manufactured by extrusion molding. In addition, the long rod 121 and the short rod 122 may be manufactured by other methods such as protrusion molding, injection molding or press molding.

Both end surfaces of the long rod 121 and the short rod 122 are formed in crossing slopes in the longitudinal direction, respectively. Each of the long rod 121 and the short rod 122 has an angle of inclination of the slopes of opposite ends with respect to the longitudinal direction which are substantially the same, and the directions of inclination are opposite to each other. For example, if the angle of inclination and the direction of inclination of one slope are plus 30 degrees, those of the other slope are minus 30 degrees. Both of the angles of inclination of the slopes in the long rod 121 and the short rod 122 are substantially the same. The long rods 121 and 121 are arranged facing each other, and the short rods 122 and 122 are arranged facing each other while being orthogonal to the long rods 121 and 121. At this time, the end surfaces of the long rod 121 and the short rod 122 are arranged to face each other.

Figure 8B:
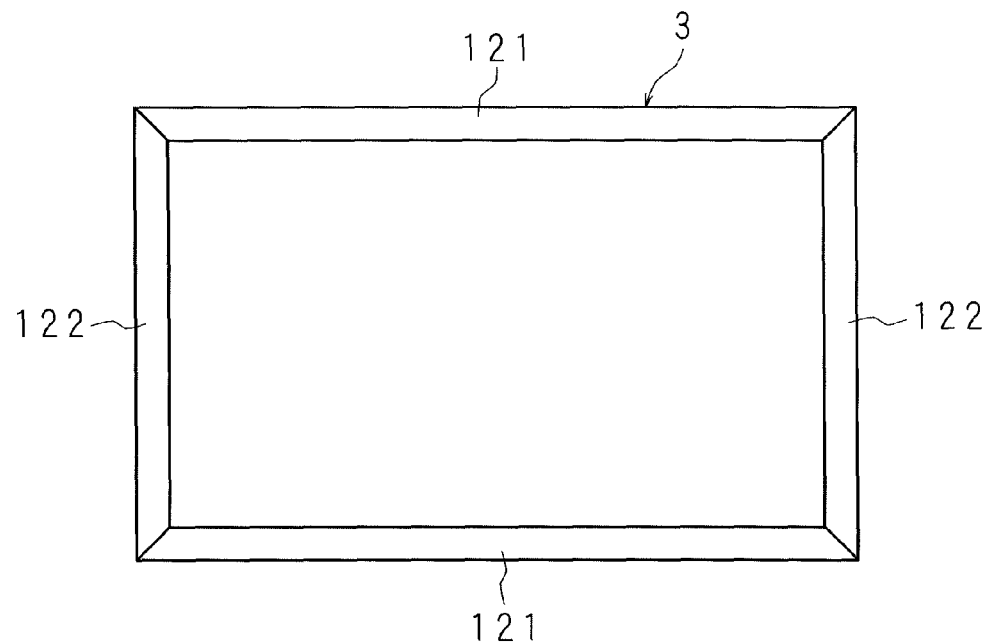
FIG. 8B is a view for illustrating the manufacturing process of the front cabinet.

As shown in FIG. 8B, the front cabinet 3 is manufactured by joining the end surfaces of the long rod 121 and the short rod 122. In addition, the joining of the long rod 121 and the short rod 122 are achieved by a publicly known joining means. For example, a bracket is installed on the joint part between the long rod 121 and the short rod 122 and the screws are fixed thereto. If the long rod 121 and the short rod 122 are made of metal, jointing may be done by welding. When at least one of the long rod 121 and the short rod 122 is made of resin material, joining may be done by high-frequency wave fusion. In addition, the manufacturing method of the front cabinet 3 is not limited to the above-described method. For example, the entire front cabinet 3 may be molded integrally by injection molding.

Embodiment 2

Figure 9:
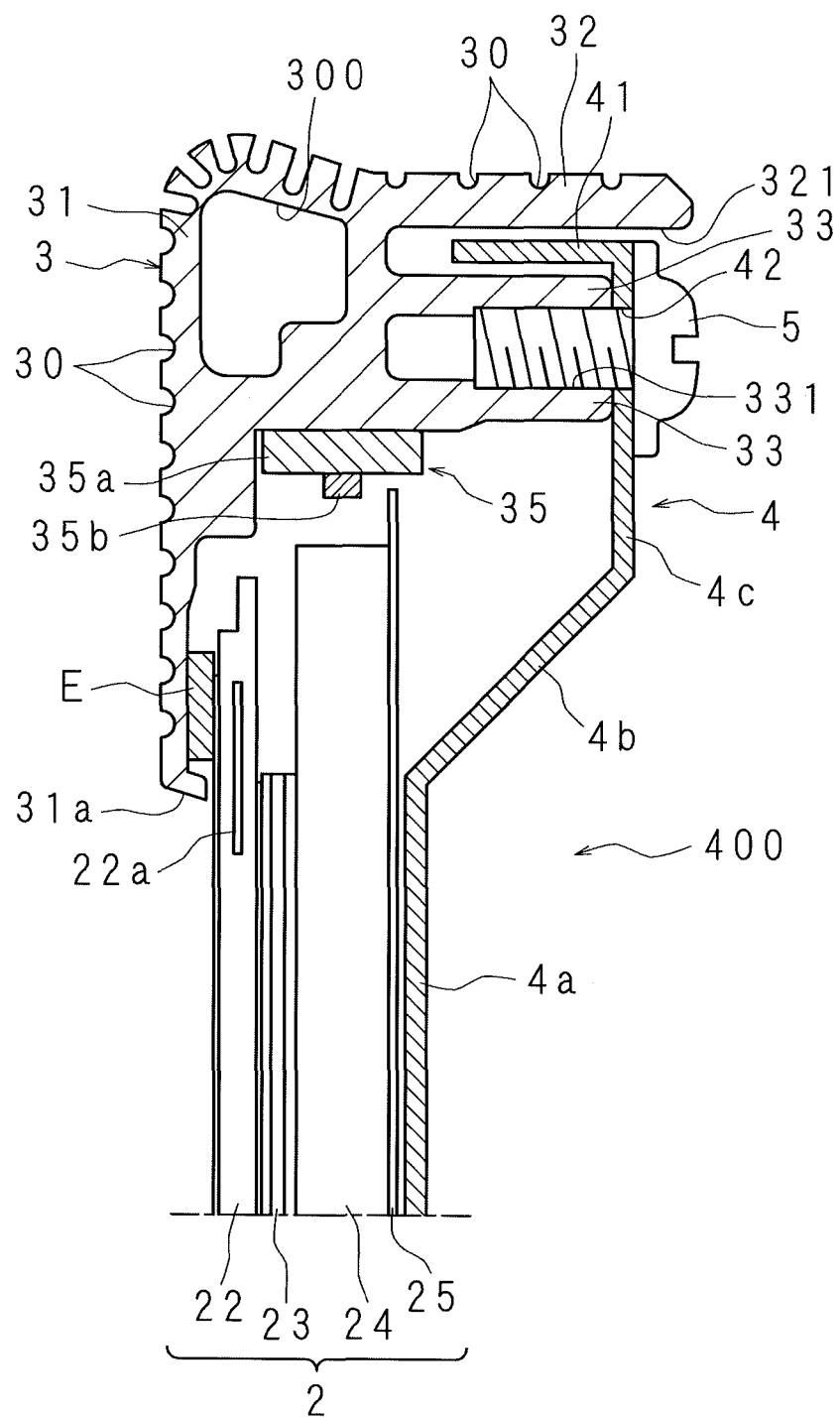
FIG. 9 is a longitudinal-sectional view schematically showing a part of a television receiver according to Embodiment 2.
Figure 10:
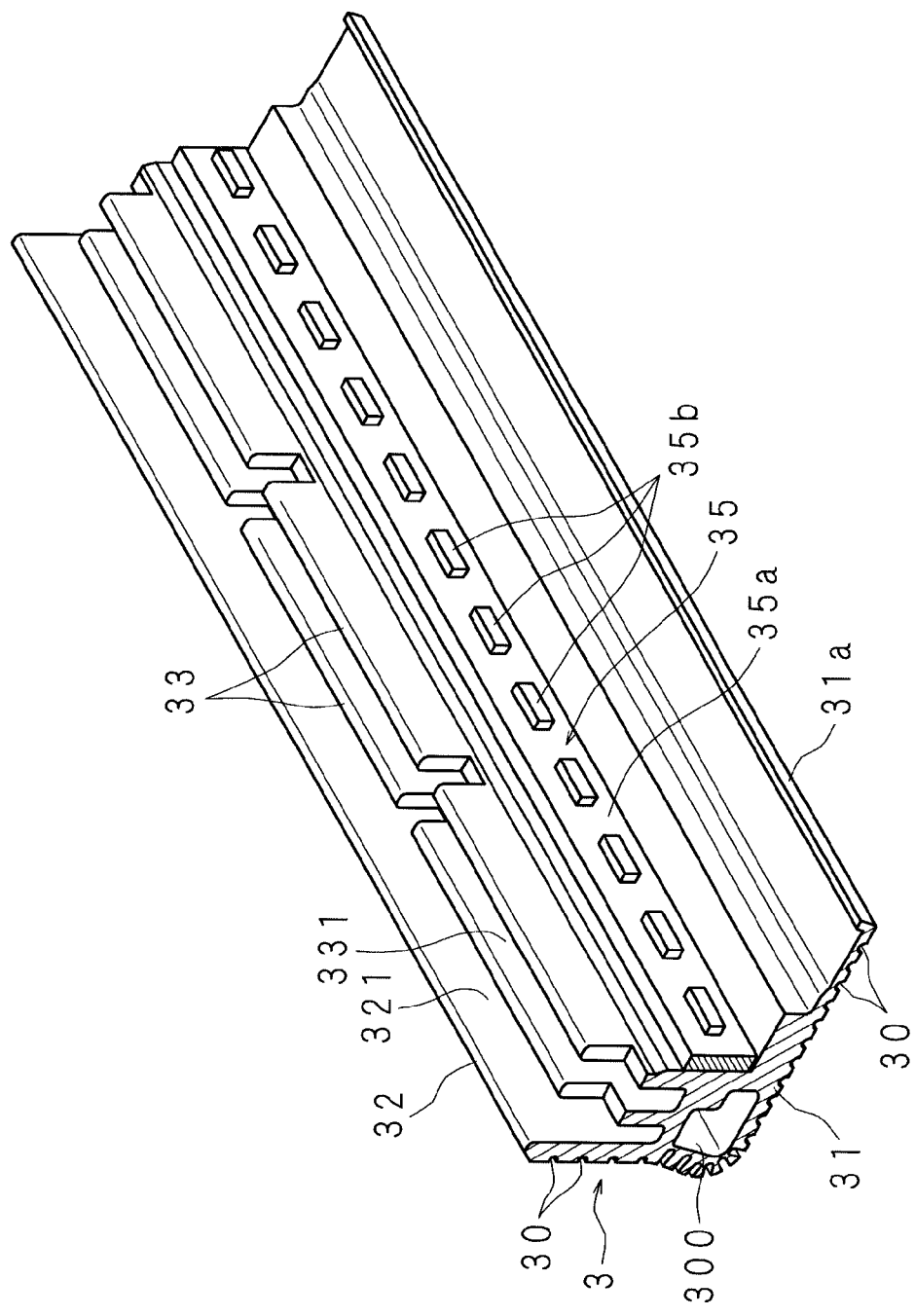
FIG. 10 is a perspective view schematically showing a part of the front cabinet.

FIG. 9 is a longitudinal-sectional view substantially showing a part of the television receiver 1, and FIG. 10 is a perspective view substantially showing a part of the front cabinet 3.

In a back cabinet 4, a bottom portion 4*a* of a concave part 400 is formed in a plate shape substantially parallel to a light guide plate 24, and faces a reflection sheet 25 while being adjacent thereto. The dimensions of top, bottom, left and right of the bottom portion 4*a* are substantially the same as those of an opening 31*a*. The peripheral edge portion of the bottom portion 4*a* faces an edge part of the opening 31*a* and is positioned on the radially inner side (the opening 31*a* side) from an elastic member E. A lateral portion 4*b* of the concave part 400 continues to the bottom portion 4*a* and is inclined so as to expand backward from the bottom portion 4*a*. The portion where the bottom portion 4*a* and the lateral portion 4*b* continue faces a light shielding part 22*a* in the front-back direction.

In the back cabinet 4, the front-back width between at least the bottom portion 4a and the edge part of the opening 31a is narrower than the other places, so that the light guide plate 24 and the liquid crystal panel 22 are held in this narrowed portion. Therefore, the holding force is improved, and the light guide plate 24 and the liquid crystal panel 22 can be fixed in a predetermined position.

Since the display panel 10 is held by the light shielding part 22a or outside of the light shielding part 22a through the elastic member E, distortion in the liquid crystal panel 22 occuring due to holding stays around the light shielding part 22a. Therefore, no distortion effects occur in an image displayed on the side inner than the light shielding part 22a.

The same parts of the television receiver 1 according to Embodiment 2 as in Embodiment 1 will be denoted by the same reference numerals, and a description thereof will be omitted.

Embodiment 3

Figure 11:
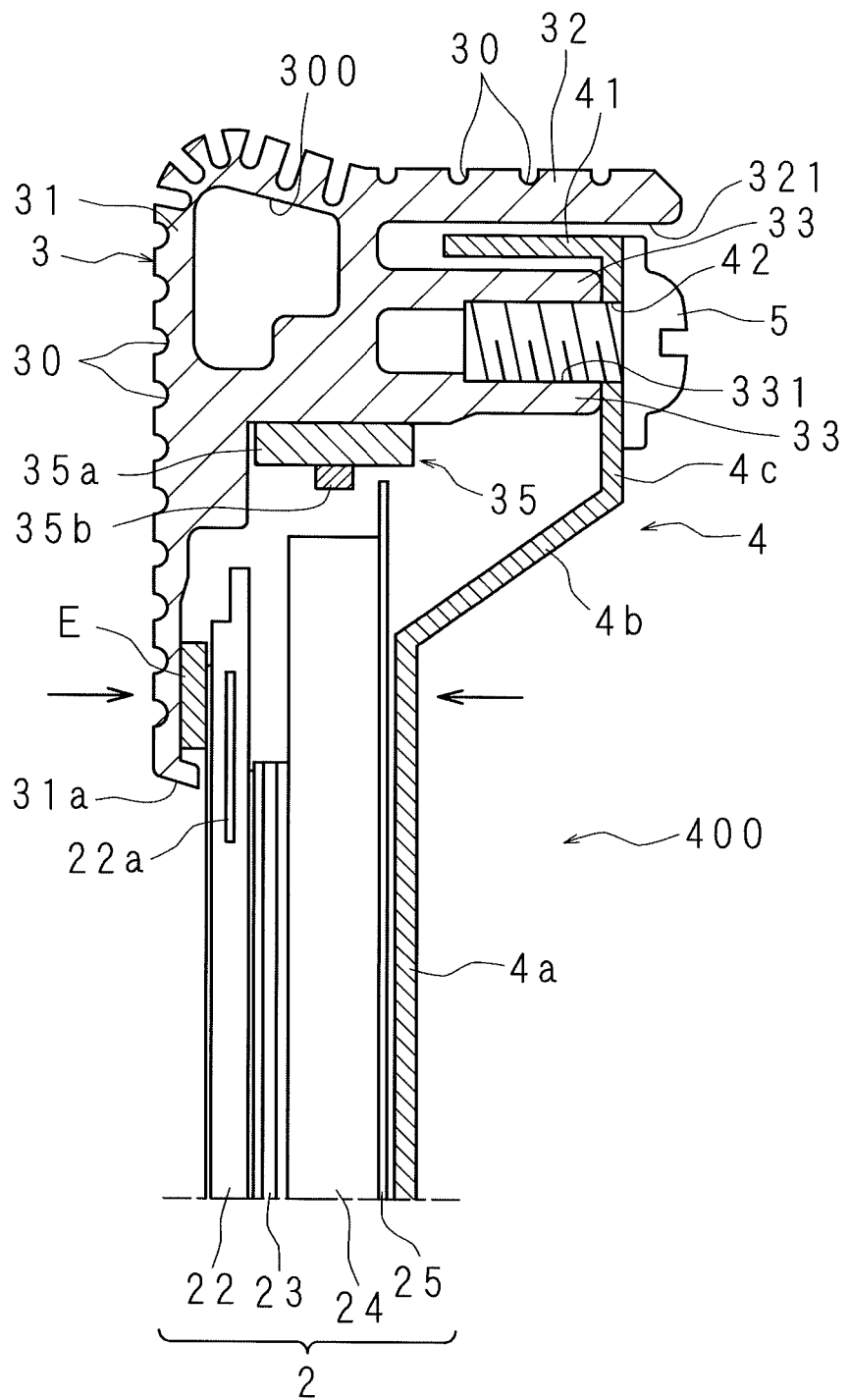
FIG. 11 is a longitudinal-sectional view schematically showing a part of a television receiver according to Embodiment 3.

FIG. 11 is a longitudinal-sectional view schematically showing a part of the television receiver 1. As shown in FIG. 11, in a back cabinet 4, a peripheral edge portion of a bottom portion 4a of a concave part 400 faces an elastic member E. The peripheral edge portion of the bottom portion 4a and the elastic member E (an edge part of the opening 31a) exist at the same position in the direction orthogonal to the front-back direction. Therefore, when a tapping screw 5 is screwed in a rib 33, forces opposite to each other act in the front and back to a liquid crystal panel 22 and a light guide plate 24 between the peripheral edge portion of the bottom portion 4a and the edge part of the opening 31a (see arrows shown in FIG. 11). The liquid crystal panel 22 and the light guide plate 24 are held by strong forces in the front and back to be stably supported.

The same parts of the television receiver 1 according to Embodiment 3 as in the Embodiments 1 and 2 will be denoted by the same reference numerals, and a description thereof will be omitted.

Embodiment 4

Figure 12:
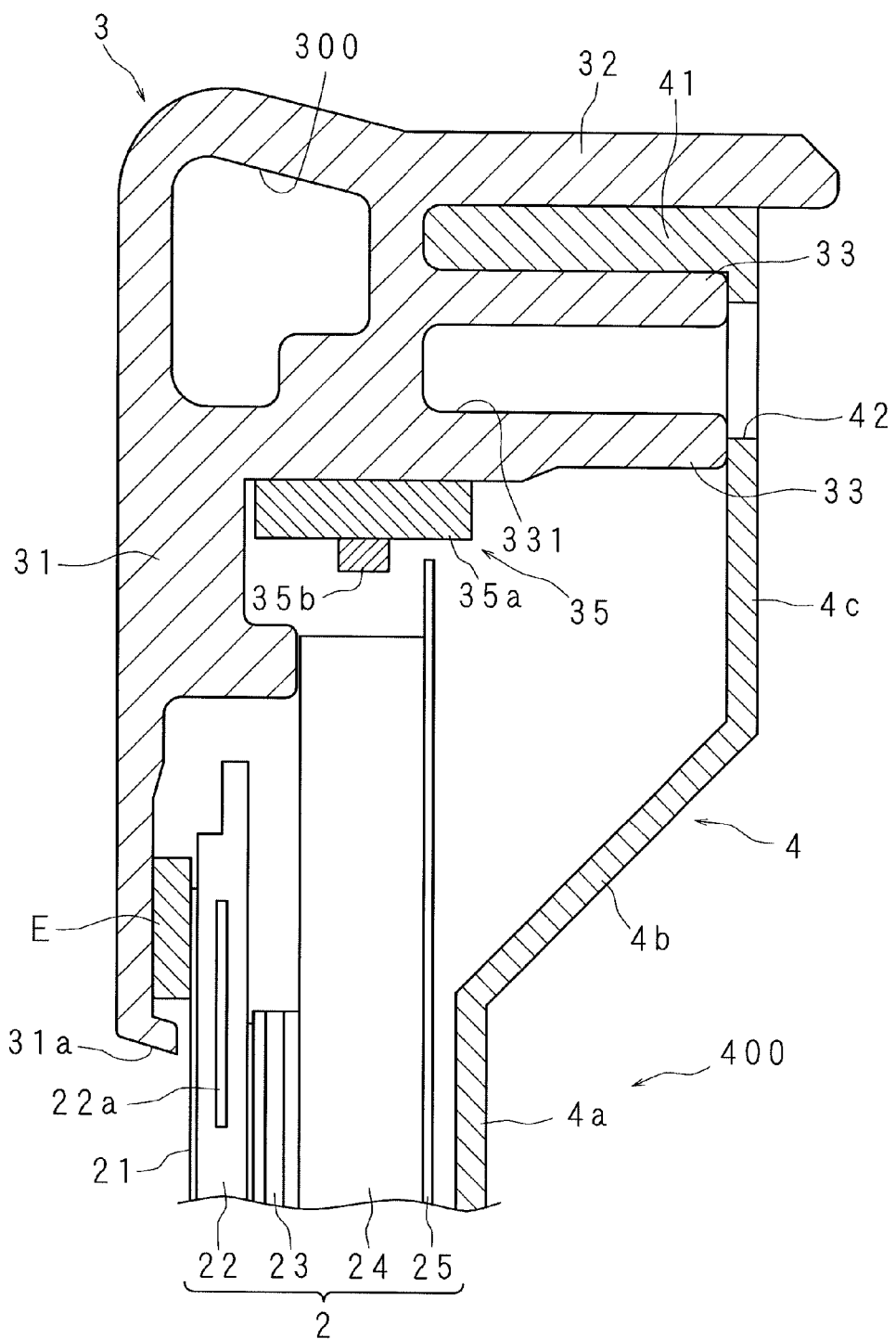
FIG. 12 is a longitudinal-sectional view schematically showing a part of a television receiver according to Embodiment 4.

FIG. 12 is a longitudinal-sectional view substantially showing a part of a television receiver 1. In FIG. 12, illustration of the tapping screw 5 is omitted. As shown in FIG. 12, grooves 30 are not formed on the surface of a front cabinet 3. Also in this case, it is possible to reduce the flow rate of the heat transmitted from an LED 35b to the front corner of the front cabinet 3 by a cavity 300.

Further, the cavity 300 has the effect that a user barely feels any heat when he or she touches a front corner of the front cabinet 3. Further, it is possible to save material as much as that of the volume of the cavity 300 by providing the front cabinet 3 with the cavity 300.

Embodiment 5

Figure 13:
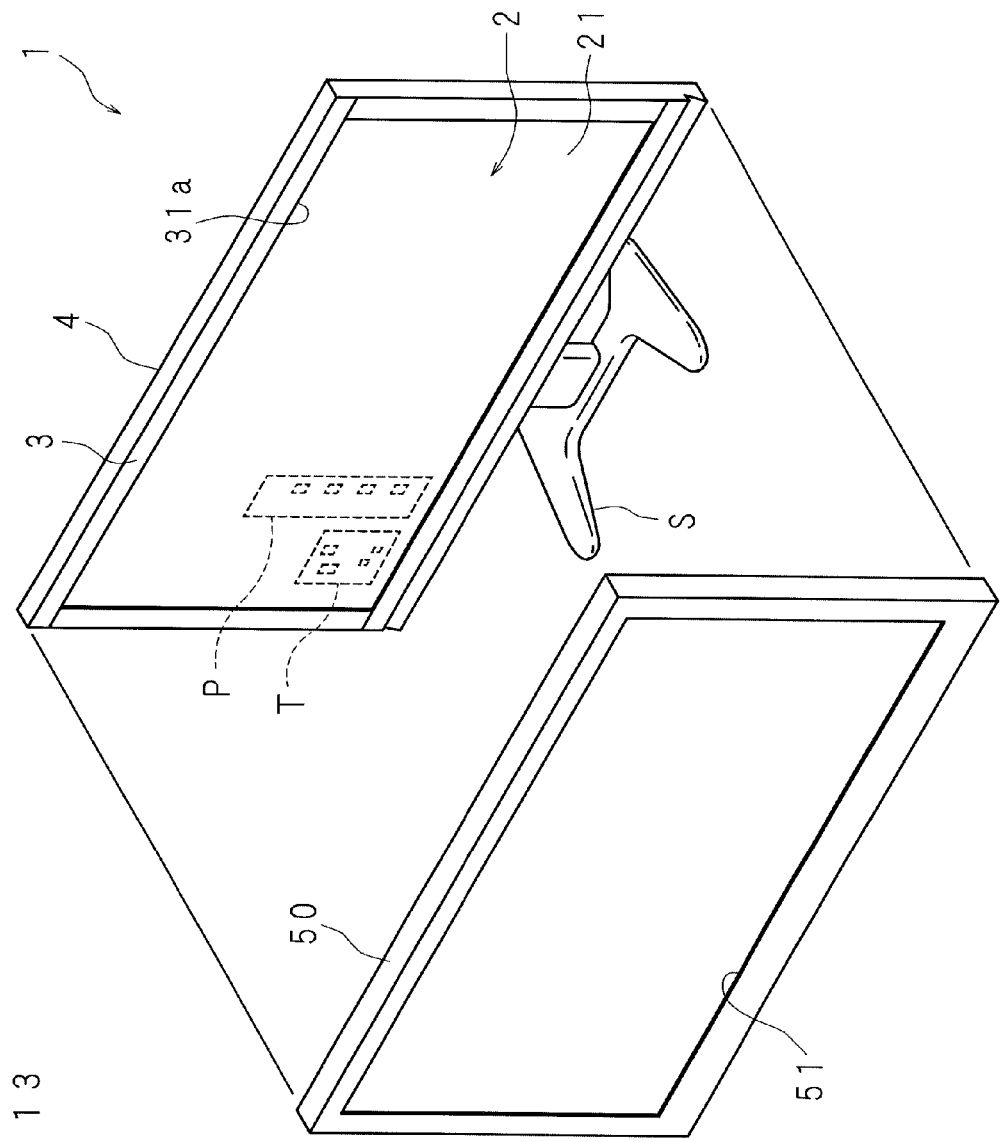
FIG. 13 is an exploded perspective view schematically showing a television receiver according to Embodiment 5.
Figure 14:
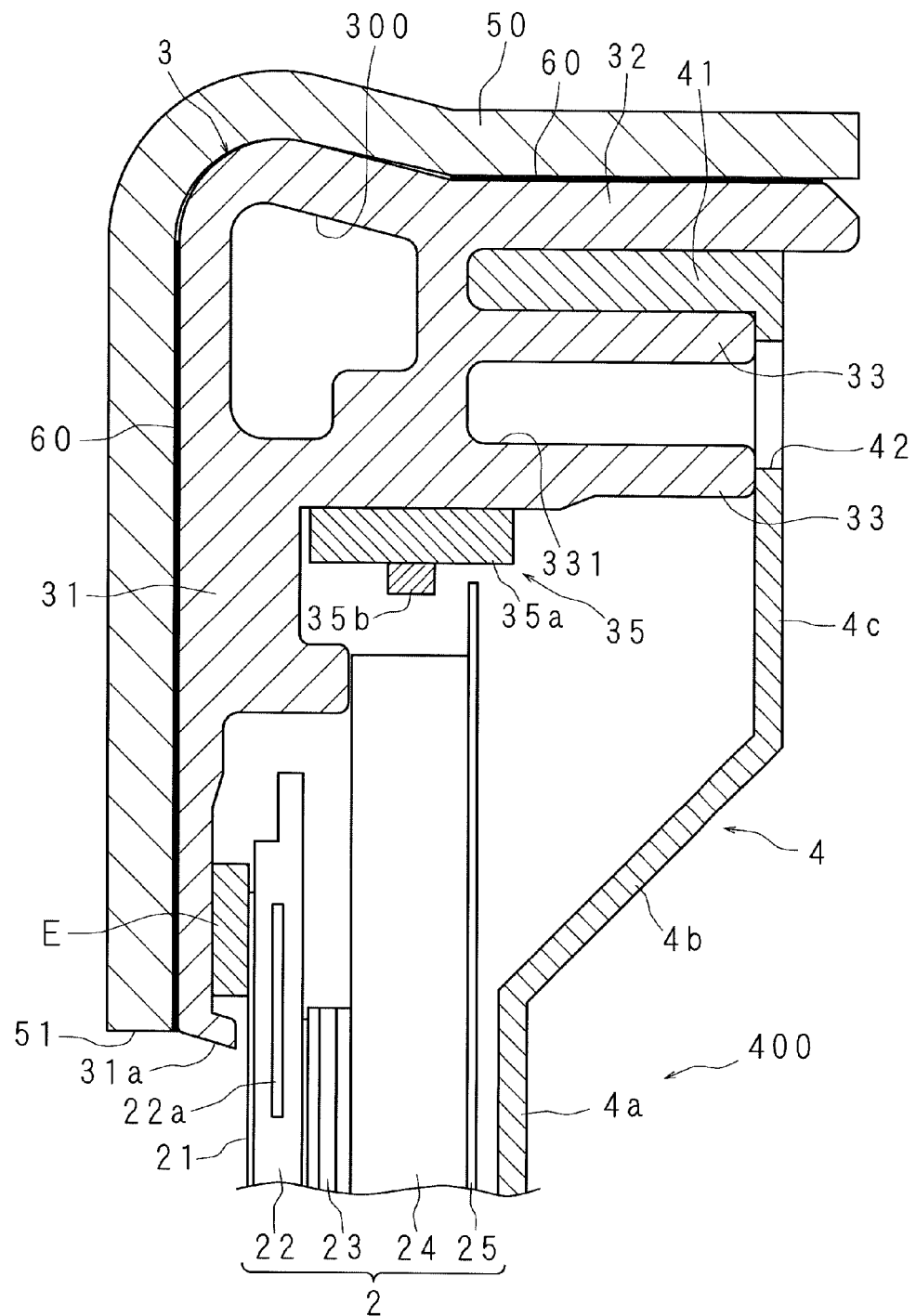
FIG. 14 is a longitudinal-sectional view schematically showing a part of a television receiver according to Embodiment 4.

FIG. 13 is an exploded perspective view schematically showing a television receiver 1, and FIG. 14 is a longitudinal-sectional view schematically showing a part of the television receiver.

As shown in FIG. 13, the television receiver 1 includes a cover 50 with a rectangular frame shape. The cover 50 is made of a resin member (for example, a polystyrene or acryl based resin member or the like), and has an opening 51 with a dimension substantially equal to the opening 31a of the front cabinet 3. Further, the outer dimension of the cover 50 is slightly greater than that of the front cabinet 3.

As shown in FIG. 14, the cover 50 covers the entire outer surface of the front cabinet 3, and covers the joint part of a long rod 121 and a short rod 122 composing the front cabinet 3. Further, the cover covers the upper portion of the front cabinet 3 in which a light source 35 is installed. A double-sided tape 60 is attached between the cover 50 and the outer surface of the front cabinet 3, and the cover and the front cabinet are adhered by the double-sided tape 60. The heat conducted to the front cabinet 3 is further conducted to the cover 50 to be discharged to the outside.

In the television receiver 1 according to Embodiment 5, the outer surface of the front cabinet 3 is wholly covered, so that the user does not come into direct contact with the front cabinet 3. The heat conducted to the front cabinet 3 is further conducted to the cover 50 to be discharged to the outside, but the conduction of heat is alleviated by the cover 50, so that the user will not feel excessive hotness from the heat conducted from the light source 35 to the front cabinet 3 and safety can be improved. Further, the joint part between the long rod 121 and the short rod 122 are covered with the cover 50, and thereby it is possible to block light leakage from the joint part. Further, the cover 50 covers the upper portion of the front cabinet 3 in which the light source 35 is installed. That is, on the outer surface of the front cabinet 3, the cover 50 covers the portion corresponding to the inner surface on which the light source 35 is installed (right behind the light source 35), and covers the place where the heat conduction from the light source 35 is most significant, thereby safety is surely improved. Further, grooves 30 may be formed on the outer surface of the front cabinet 3.

The same parts of the television receiver according to Embodiment 5 as in the Embodiments 1 to 4 will be denoted by the same reference numerals, and a description thereof will be omitted.

Embodiment 6

Figure 15:
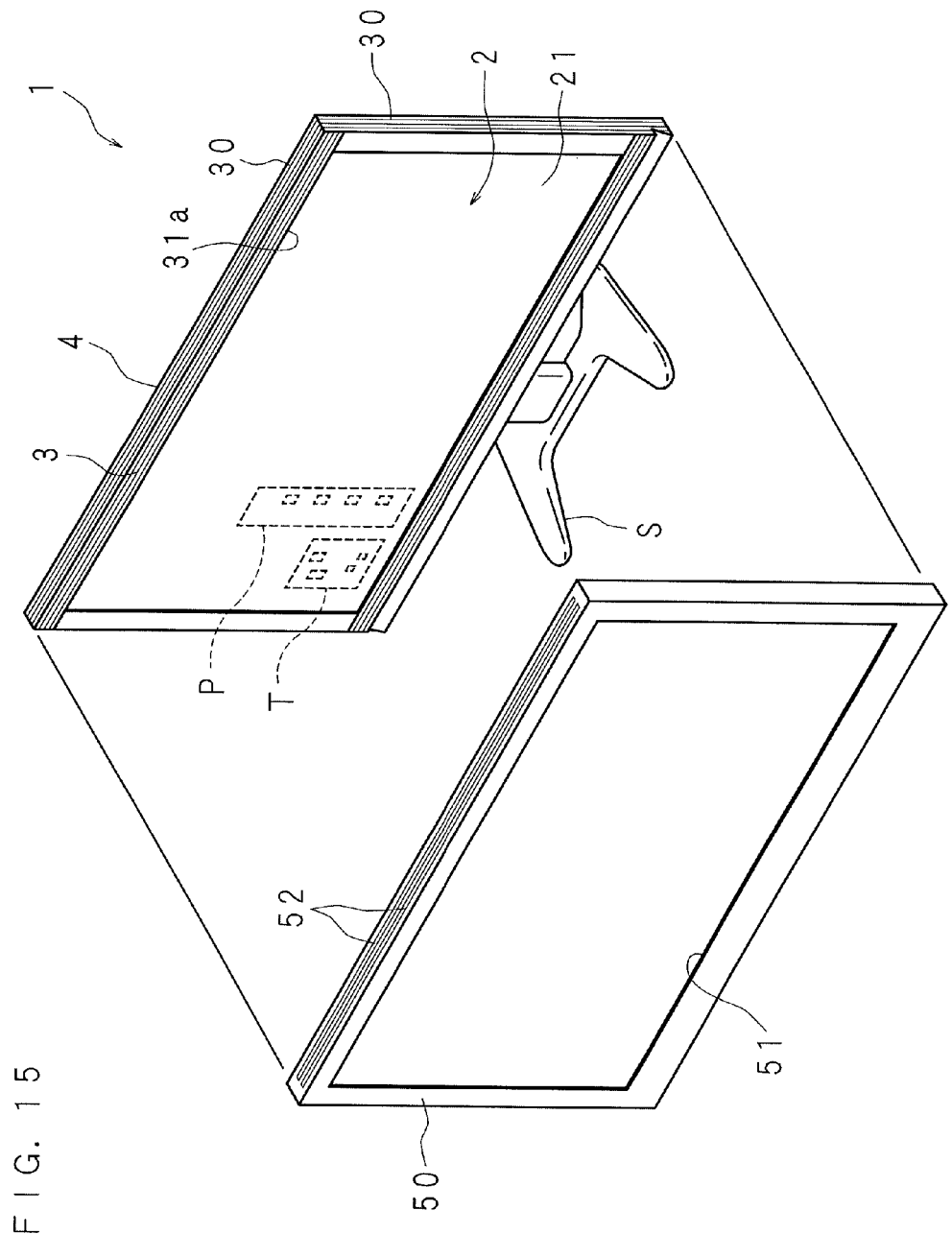
FIG. 15 is an exploded perspective view schematically showing a television receiver according to Embodiment 6.
Figure 16:
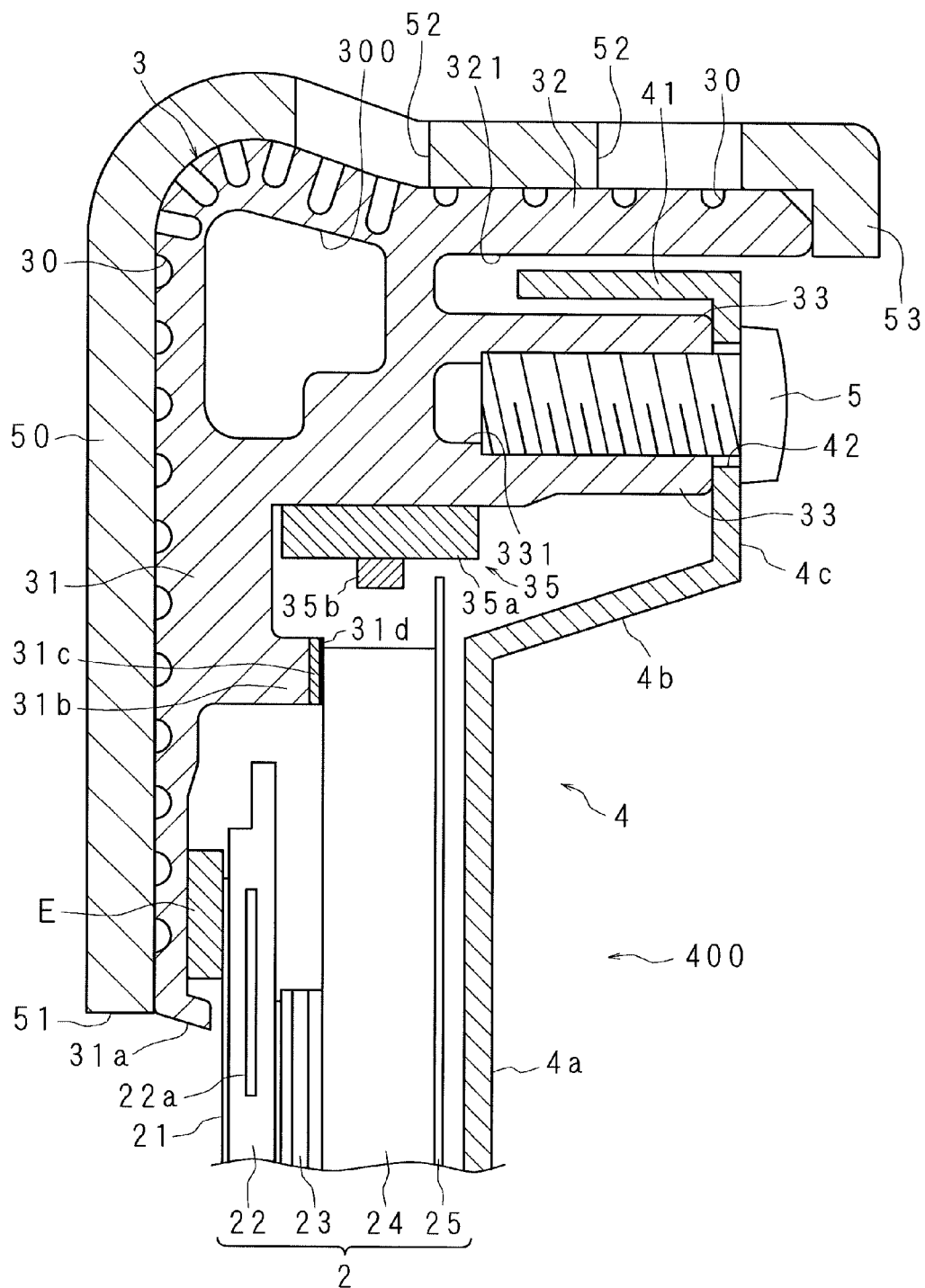
FIG. 16 is a longitudinal-sectional view schematically showing a part of the television receiver.

FIG. 15 is an exploded perspective view schematically showing the television receiver 1, and FIG. 16 is a longitudinal-sectional view schematically showing a part of the television receiver.

As shown in FIG. 15, a plurality of laterally long slits (through holes) 52 are formed in parallel on the upper portion of a cover 50. As shown in FIG. 16, a protrusion part 53 protruding radially inward is formed at the rear end of the cover 50. As shown in FIG. 16, the television receiver 1 includes a light source 35 in the upper portion of the front cabinet 3. When the cover 50 is mounted on the front cabinet 3, the slit 52 is positioned on the upper side of the front cabinet 3. Further, the protrusion part 53 is locked to the rear end portion of the front cabinet 3.

In the television receiver 1 according Embodiment 6, since the slit 52 is formed on the cover 50, the high-temperature portion is covered to improve safety, and the heat conducted to the front cabinet 3 can be reliably discharged from the slit 52, so that the radiation efficiency can be improved. The cover 50 is mounted on the front cabinet 3 by the protrusion part 53 locked to the rear end portion of the front cabinet 3, but the cover 50 and the front cabinet 3 may be adhered by a double-sided tape attached between the cover 50 and the outer surface of the front cabinet 3. Further, the position of the slit 52 is not limited to the upper portion of the cover, but the slit 52 may be formed at a position corresponding to the light source 35. For example, when the light source 35 is installed in the left and right portions or the lower portion of the front cabinet 3, the slit 52 may be formed in the left and right portions or the lower portion of the cover 50. Further, the grooves 30 are formed on the outer surface of the front cabinet 3, but the groove 30 may also be not formed.

The same parts of the television receiver according to Embodiment 6 as in the Embodiments 1 to 5 will be denoted by the same reference numerals, and a description thereof will be omitted.

Embodiment 7

Figure 17:
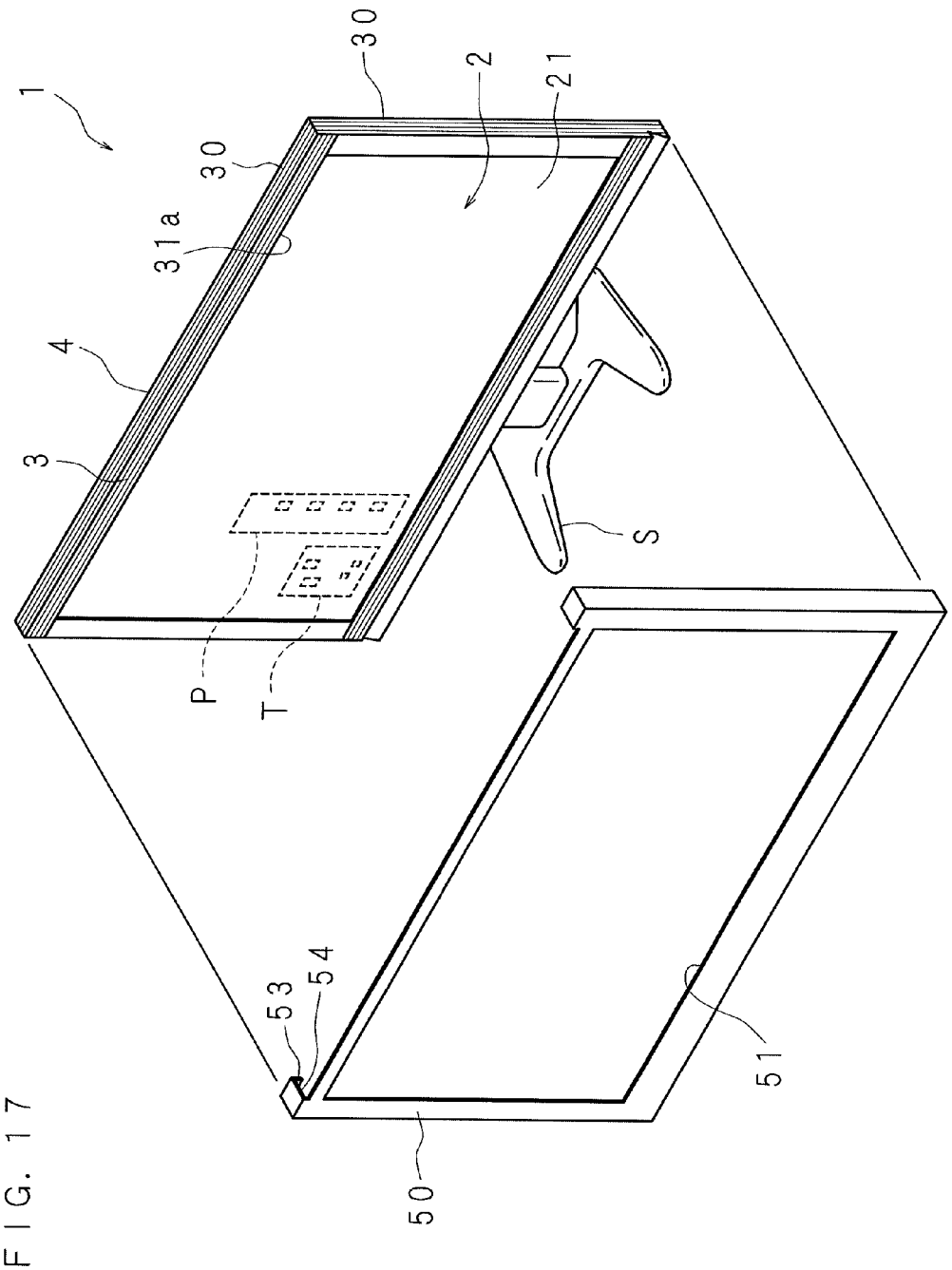
FIG. 17 is an exploded perspective view schematically showing a television receiver according to Embodiment 7.
Figure 18:
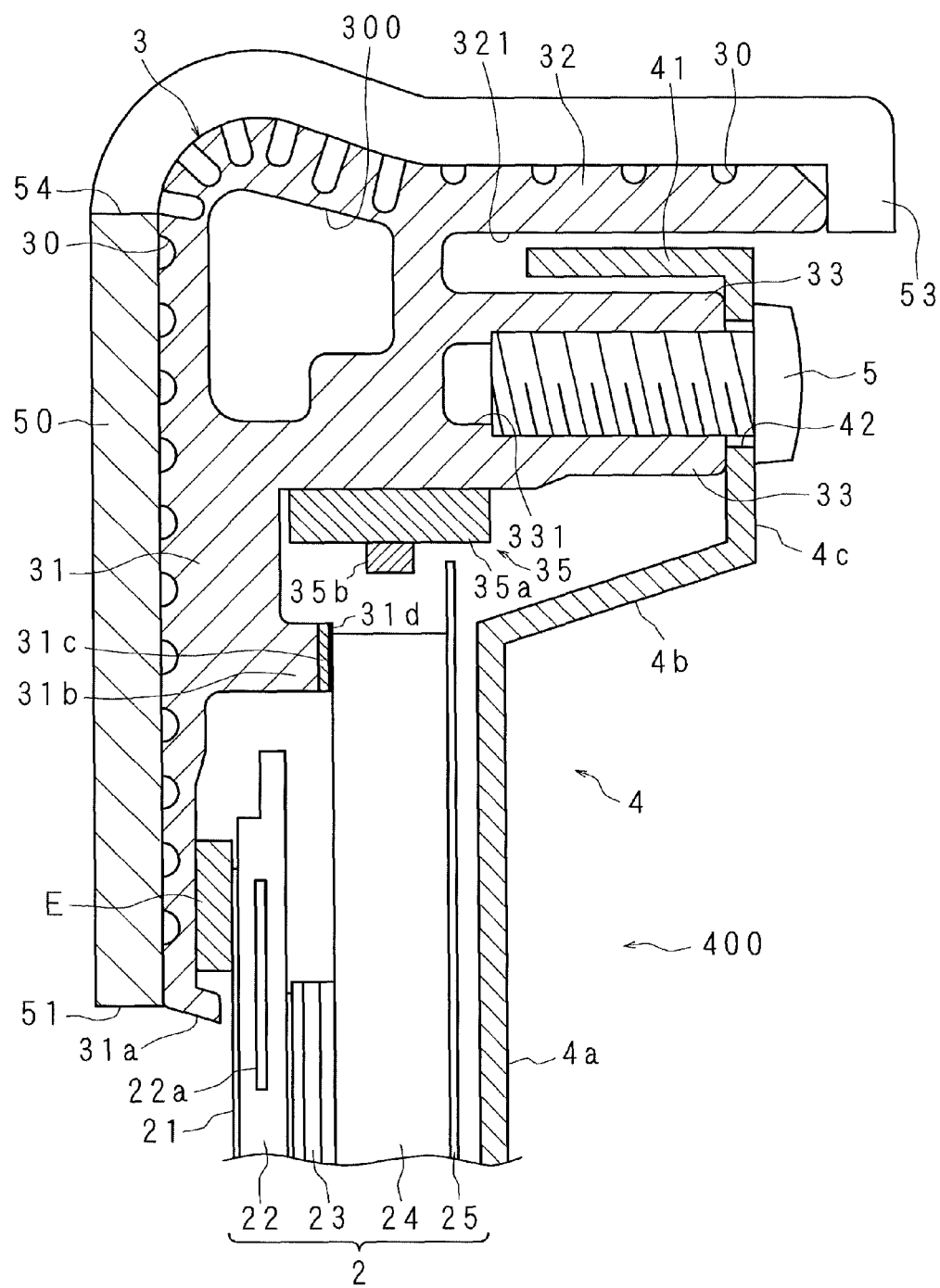
FIG. 18 is a longitudinal-sectional view schematically showing a part of the television receiver.

FIG. 17 is an exploded perspective view schematically showing a television receiver 1, and FIG. 18 is a longitudinal-sectional view schematically showing a part of the television receiver 1.

As shown in FIG. 17, a notch (a non-covering portion) 54 is formed on the upper portion of a cover 50. The notch 54 is formed across the front portion and the upper surface portion of the cover 50. As shown in FIG. 18, the television receiver 1 includes a light source 35 installed in the upper portion of a front cabinet 3. Therefore, when the cover 50 is mounted on the front cabinet 3, the notch 54 is positioned at the upper side of the front cabinet 3, so that the upper portion of the front cabinet 3 is exposed.

In the television receiver 1 according to Embodiment 7, the notch 54 is formed on the cover 50, so that the heat conducted from the light source 35 to the front cabinet 3 can be reliably discharged from the notch 54. Further, instead of the notch 54, the cover may include a hole or a gap portion formed so as to wholly expose the upper portion of the front cabinet 3. Further, the grooves 30 are formed on the outer surface of the front cabinet 3, but the grooves 30 may be not formed as well. The cover 50 is mounted on the front cabinet 3 by the protrusion part 53 locked in the rear end portion of the front cabinet 3, but the cover 50 and the front cabinet 3 may be adhered by a double-sided tape attached between the cover 50 and the outer surface of the front cabinet 3.

The same parts of the television receiver according to Embodiment 7 as in the Embodiments 1 to 6 will be denoted by the same reference numerals, and a description thereof will be omitted.

Embodiment 8

Figure 19:
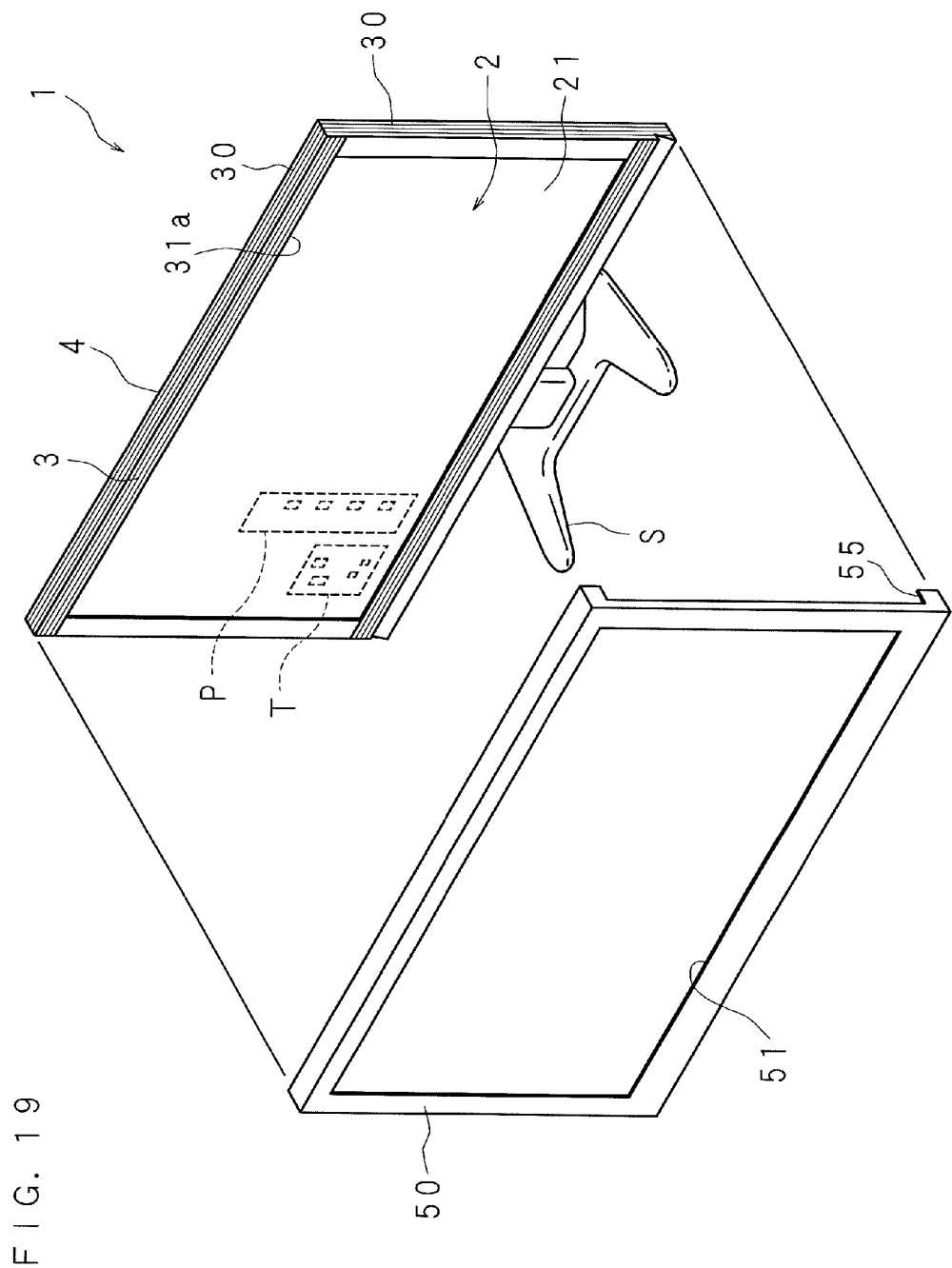
FIG. 19 is an exploded perspective view schematically showing a television receiver according to Embodiment 8.

FIG. 19 is an exploded perspective view schematically showing a television receiver 1.

As shown in FIG. 19, notches (non-covering portions) 55 and 55 are formed on the left and right of the cover 50. When the cover 50 is mounted on the front cabinet 3, the notches 55 and 55 are positioned on the left and right of the front cabinet 3. The television receiver 1 includes a light source 35 installed on the upper portion of the front cabinet 3, so that the cover 50 covers the upper portion of the front cabinet 3 in which the light source 35 is installed, but does not cover the left and right portions of the front cabinet 3 in which the light source 35 is not installed.

In the television receiver 1 according to Embodiment 8, the high-temperature part (the upper portion of the front cabinet 3 in which the light source 35 is installed) is covered by the cover 50, so that safety can be improved. Further, since the left and right portions of the front cabinet 3 are exposed through the notches 55 and 55, the heat of the light source 35 conducted to the left and right portions is reliably discharged, and thereby it is possible to achieve both improved safety and the improvement of radiation efficiency. Further, the position of the notch 55 is not limited to the left and right portions. For example, the notch may be formed on the lower portion of the front cabinet 3. Further, instead of the notch 55, the cover may include a hole or a gap portion formed so as to wholly expose the left and right portions or the lower portion of the front cabinet 3. Further, the grooves 30 are formed on the outer surface of the front cabinet 3, but the groove 30 may be not formed as well. The cover 50 is mounted on the front cabinet 3 by the protrusion part 53 locked to the rear end portion of the front cabinet 3, but the cover 50 and the front cabinet 3 may be adhered by a double-sided tape attached between the cover 50 and the outer surface of the front cabinet 3.

The same parts of the television receiver according to Embodiment 8 as in the Embodiments 1 to 7 will be denoted by the same reference numerals, and a description thereof will be omitted.

Embodiment 9

Figure 20:
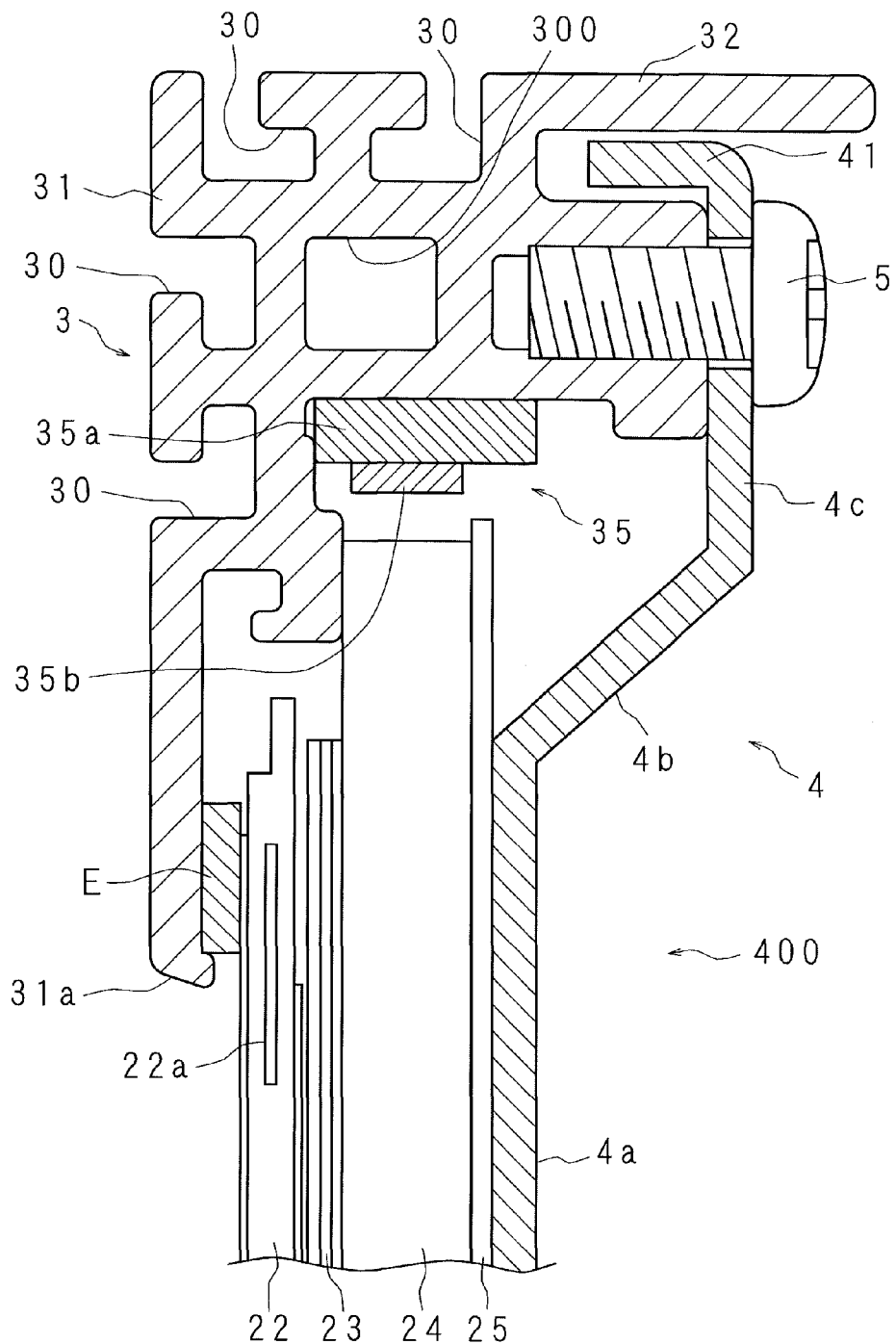
FIG. 20 is a longitudinal-sectional view schematically showing a part of a television receiver according to Embodiment 9.

FIG. 20 is a longitudinal-sectional view schematically showing a part of a television receiver. As shown in FIG. 20, a plurality of grooves 30 of an L-shaped cross section are formed along a cavity 300 on a front surface part 31 and a peripheral surface part 32 of a front cabinet 3. Since the groove 30 has the L-shaped cross section, it is possible to make the inside area of the groove 30 larger than that of a semi-circular shape. As a result, it is possible to increase the surface area of the front cabinet 3, and thereby the radiation efficiency can be improved.

The same parts of the television receiver according to Embodiment 3 as in the Embodiments 1 to 8 will be denoted by the same reference numerals, and a description thereof will be omitted.

Embodiment 10

Figure 21:
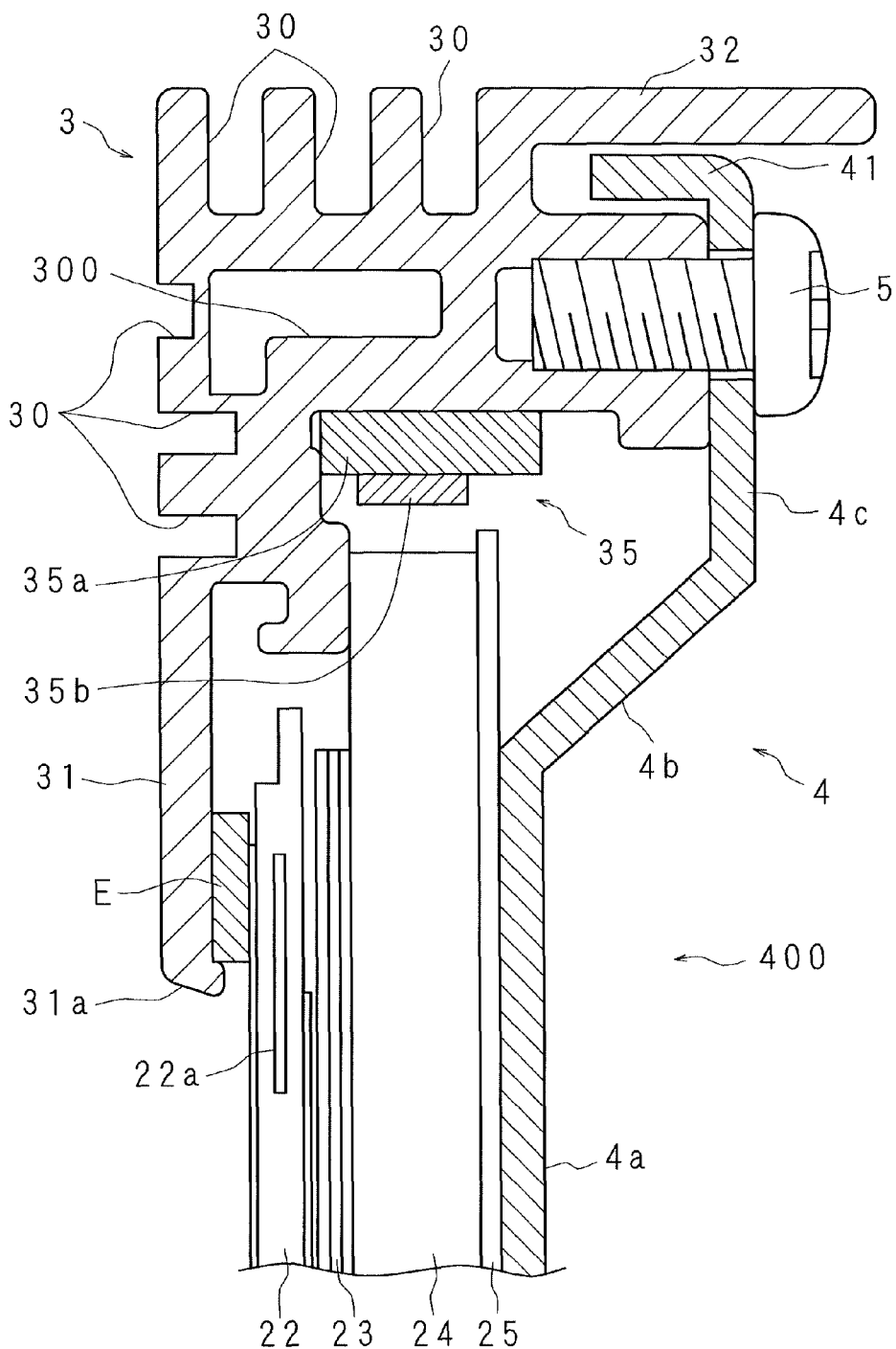
FIG. 21 is a longitudinal-sectional view schematically showing a part of a television receiver according to Embodiment 10.

FIG. 21 is a longitudinal-sectional view substantially showing a part of a television receiver. As shown in FIG. 21, a plurality of grooves 30 of a rectangular-shaped cross section are formed along a cavity 300 on a front surface part 31 and a peripheral surface part 32 of a front cabinet 3. Since the groove 30 has the rectangular-shaped cross section, a fin-shaped portion is formed around the groove 30. As a result, it is possible to increase the surface area of the front cabinet 3, and thereby the radiation efficiency can be improved. In addition, a groove 30 having the rectangular-shaped cross section is easy to process and can ensure that the front cabinet 3 is manufactured efficiently.

The same parts of the television receiver according to Embodiment 10 as in the Embodiments 1 to 9 will be denoted by the same reference numerals, and a description thereof will be omitted.

Embodiment 11

Figure 22:
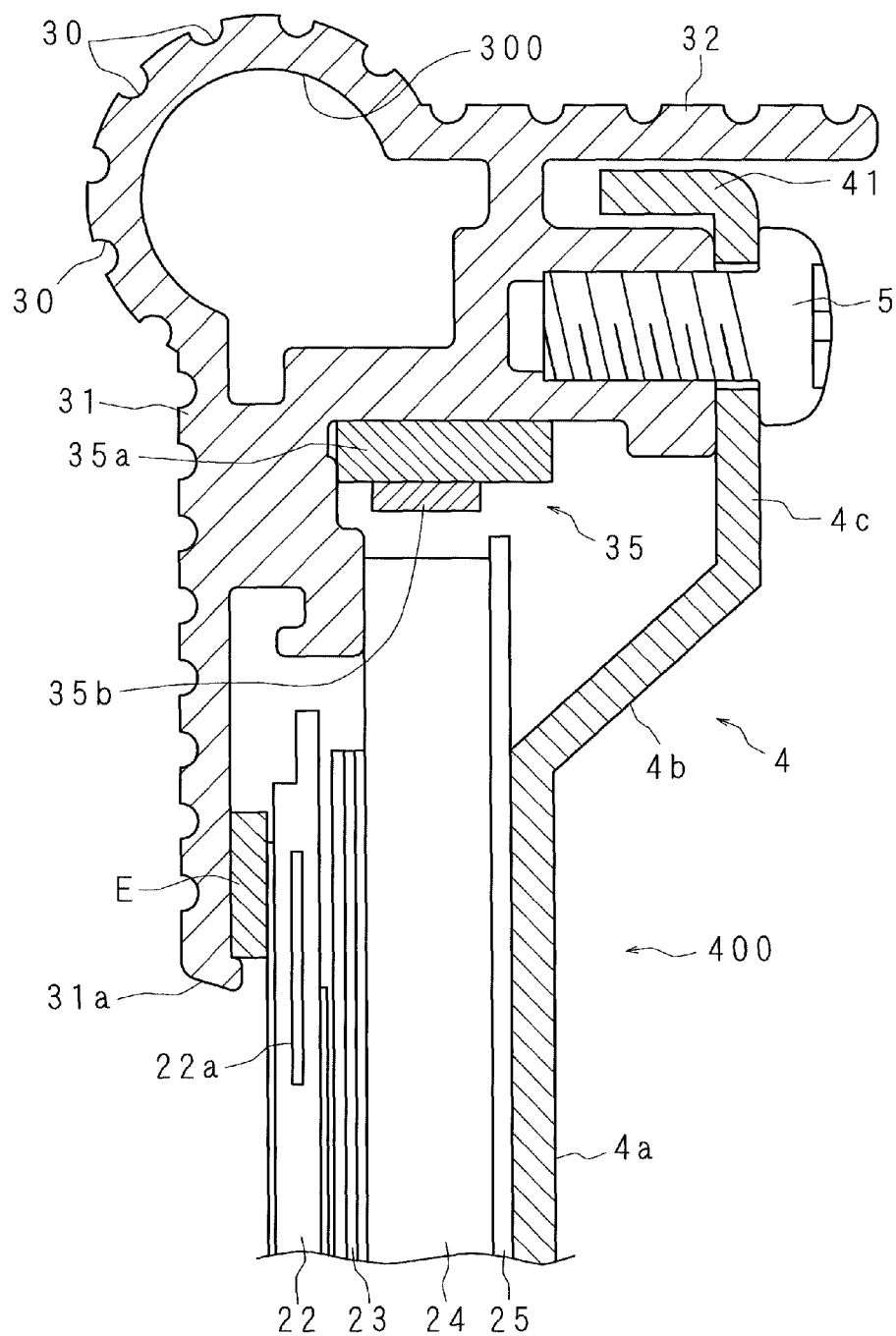
FIG. 22 is a longitudinal-sectional view schematically showing a part of a television receiver according to Embodiment 11.

FIG. 22 is a longitudinal-sectional view schematically showing a part of a television receiver. As shown in FIG. 22, a cavity 300 is formed in the front corner of the front cabinet 3 where the front surface part 31 and the peripheral surface part 32 join. The front corner of the front cabinet 3 is formed in a curved surface shape protruded obliquely to the upper front, compared with the other portions of the front cabinet 3. In other words, the front corner is formed in a curved surface expanded obliquely to the upper front. Therefore, the surface area of the front corner increases compared with the case where it is not protruded, so that the heat radiation efficiency is improved. In addition, as the surface area increases, heat is dispersed, so that the surface temperature is lowered and safety can be enhanced. Further, compared with the case where it is not protruded, the volume of the cavity 300 increases, so that conduction of heat can be further suppressed.

The same parts of the television receiver according to Embodiment 11 as in the Embodiments 1 to 10 will be denoted by the same reference numerals, and a description thereof will be omitted.

Embodiment 12

Figure 23:
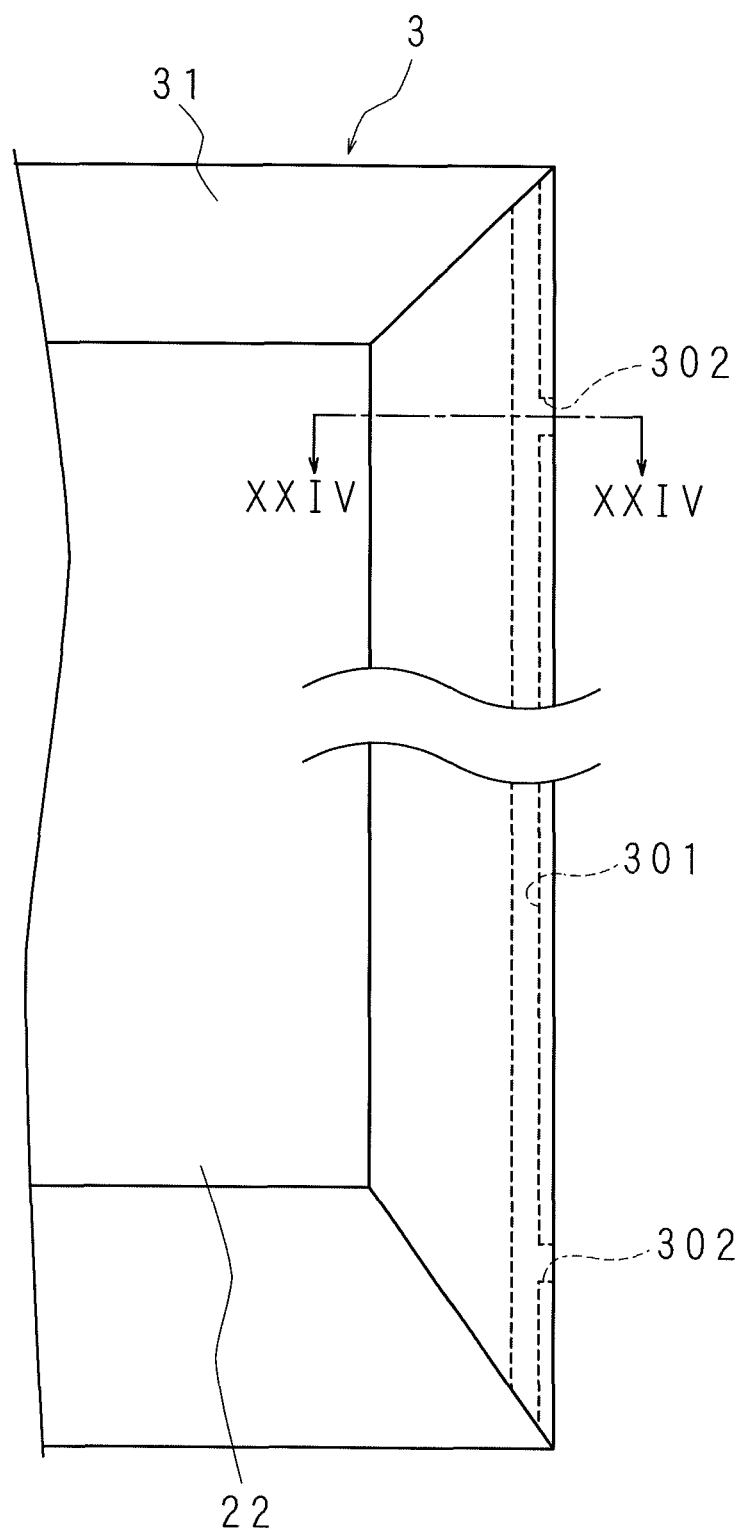
FIG. 23 is a front view schematically showing a right side portion of a television receiver according to Embodiment 12.
Figure 24:
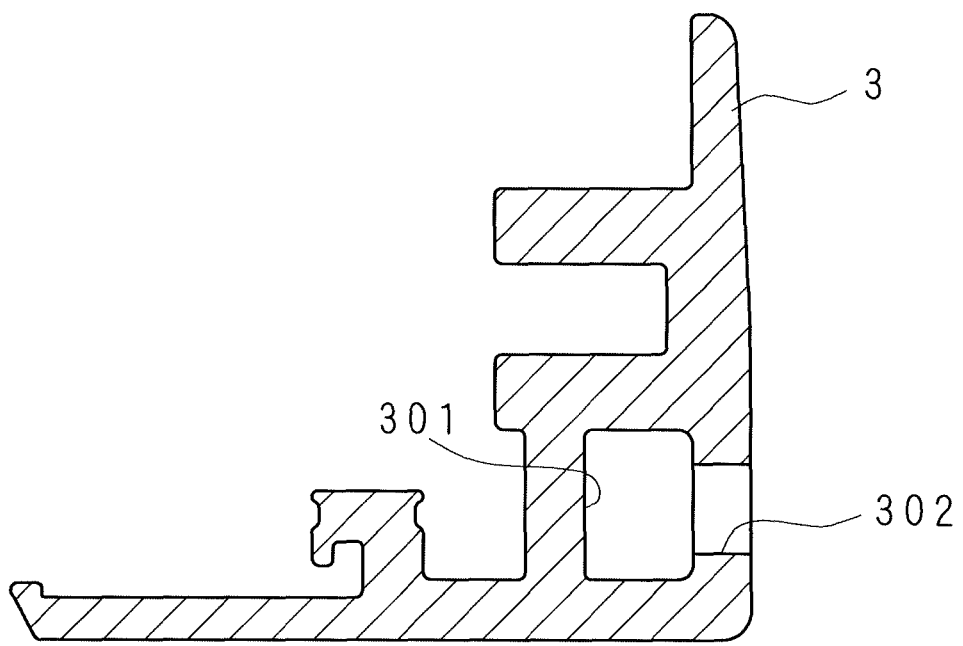
FIG. 24 is a cross-sectional view of the front cabinet taken on a line XXIV-XXIV shown in FIG. 23.

FIG. 23 is a front view substantially showing the right portion of a television receiver, and FIG. 24 is a schematic sectional view of the front cabinet 3 taken on a cutting line XXIV-XXIV shown in FIG. 23. A cavity 301 extending up and down is formed inside each of the left and right portions of the front cabinet 3. The cavity 301 is formed in a rectangular-shaped cross section. Further, the cross section shape of the cavity 301 is not limited to a rectangle, but may be a circle, L shape, or any other shape in accordance with the specification. Two communication holes 302 and 302 communicating with the outside are formed up and down in parallel in the left and right portions of the front cabinet 3. The communication holes 302 and 302 are positioned on the left and right sides to communicate with the cavity 301. Therefore, the air inside the cavity 301 warmed by the light source 35, etc. moves upward to be discharged from the communication hole 302. Further, by discharge of air, a negative pressure is formed in the cavity 301, so that outside air is supplied into the cavity 301 from the lower communication hole 302. The upper communication hole 302 functions as an air outlet hole, while the lower communication hole 302 functions as an air inlet hole. Therefore, ventilation within the cavity 301 is carried out smoothly so as to achieve fast cooling.

Further, FIGS. 23 and 24 show only the right side portion of the television receiver, but the left side portion thereof also includes a cavity 301 extending up and down and a communication hole 302 communicating with the cavity 301, as in the right side portion. In addition, the front cabinet 3 includes cavities 300 and grooves 30 (not shown) in the upper and lower portions as in other embodiments. Further, when the front cabinet 3 is molded integrally, the cavity 300 and the cavity 301 may be formed integrally.

The same parts of the television receiver according to Embodiment 12 as in the Embodiments 1 to 11 will be denoted by the same reference numerals, and a description thereof will be omitted.

Although the present invention has been described in connection with the exemplary embodiments, it is only illustrative. Various modifications and alterations of this disclosure will be apparent to those skilled in the art without departing from the scope and spirit of the appended claims and this disclosure.

DESCRIPTION OF REFERENCE NUMERALS 1 television receiver
2 display unit
21 display surface
3 front cabinet
30 groove
31 front surface part
32 peripheral surface part
35 light source
35b LED
300 cavity
4 back cabinet
T receiving unit
50 cover
52 slit (through hole)
53 protrusion part
54, 55 notch (non-covering part)

What is claimed is:
1. A display device comprising:
a display unit having a display surface on its front side,
a front cabinet enclosing a peripheral edge part of the display unit, and
a back cabinet covering a back side of the display unit,
wherein the front cabinet includes a cavity that prevents transference of heat,
a light source is installed on an inner surface of the front cabinet facing an outer peripheral surface of the display unit,
the front cabinet includes a front surface part and a peripheral surface part,
the front surface part covers a peripheral edge of the display surface,
the peripheral surface part protrudes rearward from the front surface part to enclose the outer peripheral surface of the display unit,
the cavity is formed at a corner where the front surface part and the peripheral surface part join,
the peripheral surface part comprises a groove formed on an outer surface of the peripheral surface part including the corner, and
a depth of the groove on the outer surface of the corner is deeper than the depth of grooves formed on the other portion of the peripheral surface part.

2. The display device according to claim 1, wherein the front surface part encloses a circumference of the display surface, and
the peripheral surface part is formed on a rear side of the front surface part along an outer peripheral edge of the front surface part to enclose the outer peripheral surface of the display unit.

3. The display device according to claim 2, wherein the front cabinet has grooves formed on the outer surface of the front cabinet including the corner, and a depth of the groove on the outer surface of the corner is deeper than the depth of the groove formed on the other portion of the front cabinet.

4. The display device according to claim 1, wherein a portion where the cavity is formed in the front cabinet protrudes further than other portions.

5. The display device according to claim 1, wherein the front cabinet includes a communication hole which is formed in the cavity to communicate with the outside.

6. The display device according to claim 5, wherein a plurality of communication holes are formed in the front cabinet.

7. The display device according to claim 1, wherein
the cavity is formed at a front corner where the front surface part and the peripheral surface part join;
the groove is formed on an outer surface of the front cabinet including the front corner;
a plurality of light sources are installed on the inner surface of the front cabinet facing the outer peripheral surface of the display unit to be arrayed in a direction substantially orthogonal to the normal line of the outer peripheral surface of the display unit and the normal line of the display surface; and
the groove is formed substantially parallel to the array direction of the light source.

8. The display device according to claim 7, wherein a cross-sectional shape, width, or depth of the groove is substantially constant in the array direction of the light source.

9. The display device according to claim 7, wherein the cavity is penetrated substantially parallel to the array direction of the light source.

10. The display device according to claim 1, wherein the light source is a light emitting diode which is mounted on a substrate made of aluminum, and
the substrate is installed in the front cabinet.

11. The display device according to claim 1, wherein the front cabinet is formed by extrusion molding.

12. The display device according to claim 11, wherein the front cabinet is made of metal.

13. The display device according to claim 12, wherein the front cabinet is made of aluminum.

14. The display device according to claim 1, comprising a light guide plate which is disposed on the rear side of the display unit to emit an incident light toward the display unit, wherein the display unit and the light guide plate are held in the front and back between the front cabinet and the back cabinet.

15. The display device according to claim 14, wherein the front cabinet protrudes rearward, and the light guide plate includes a pressing part configured to press the light guide plate to the rear side.

16. The display device according to claim 1, wherein the back cabinet is made of aluminum.

17. The display device according to claim 1, comprising a cover which covers at least a part of the front cabinet.

18. The display device according to claim 17, wherein the front cabinet is formed by jointing a plurality of rod-shaped members, and the cover covers a joint part between the rod-shaped members.

19. The display device according to claim 17, wherein the light source is installed on the inner surface of the front cabinet facing the outer peripheral surface of the display unit, and the cover covers a portion corresponding to the inner surface on which the light source is installed, in an outer surface of the front cabinet.

20. The display device according to claim 19, wherein a through hole is formed in a portion of the cover which covers the outer surface of the front cabinet.

21. The display device according to claim 17, wherein the cover has a non-covering part.

22. A television receiver comprising:
the display device according to claims 1; and
a receiving unit which receives television broadcasts,
wherein the display device is configured to display an image of the television broadcasts received by the receiving unit.

23. A display device comprising:
a display unit having a display surface on its front side,
a front cabinet enclosing a peripheral edge part of the display unit, and
a back cabinet covering a back side of the display unit,
wherein the front cabinet includes a cavity that prevents transference of heat,
a light source is installed on an inner surface of the front cabinet facing an outer peripheral surface of the display unit,
the front cabinet includes a front surface part and a peripheral surface part,
the front surface part covers a peripheral edge of the display surface,
the peripheral surface part protrudes rearward from the front surface part to enclose the outer peripheral surface of the display unit,
the cavity is formed at a front corner where the front surface part and the peripheral surface part join,
the front cabinet has a groove formed on an outer surface of the front cabinet including the front corner, and
a depth of the groove on the outer surface of the front corner is deeper than the depth of grooves formed on the other portion of the front cabinet.

* * * * *